US010775936B2

(12) United States Patent
Yamauchi

(10) Patent No.: US 10,775,936 B2
(45) Date of Patent: Sep. 15, 2020

(54) IMAGE RECOGNITION DEVICE, IMAGE RECOGNITION METHOD AND IMAGE RECOGNITION UNIT

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 137 days.

(21) Appl. No.: 16/068,649

(22) PCT Filed: Dec. 27, 2016

(86) PCT No.: PCT/JP2016/088863
§ 371 (c)(1),
(2) Date: Jul. 6, 2018

(87) PCT Pub. No.: WO2017/122534
PCT Pub. Date: Jul. 20, 2017

(65) Prior Publication Data
US 2019/0025986 A1 Jan. 24, 2019

(30) Foreign Application Priority Data
Jan. 13, 2016 (JP) .................................. 2016-004773

(51) Int. Cl.
G06F 3/042 (2006.01)
H04N 9/31 (2006.01)
(Continued)

(52) U.S. Cl.
CPC .......... G06F 3/0425 (2013.01); G01B 11/002 (2013.01); G01B 11/25 (2013.01);
(Continued)

(58) Field of Classification Search
CPC ......... G06F 3/0425; G06F 2203/04101; G06F 3/0317; G06F 3/0421; G06F 3/0304;
(Continued)

(56) References Cited

U.S. PATENT DOCUMENTS

2002/0125435 A1* 9/2002 Cofer .................... G01B 11/25
250/341.1
2004/0256541 A1 12/2004 Cofer et al.
(Continued)

FOREIGN PATENT DOCUMENTS

JP 2004-077290 A 3/2004
JP 2005-508027 A 3/2005
(Continued)

OTHER PUBLICATIONS

Sato et al., "Range Picture Input System Based on Space-Encoding," 1984.
(Continued)

Primary Examiner — Amit Chatly
(74) Attorney, Agent, or Firm — Oliff PLC

(57) ABSTRACT

The image recognition device includes a measurement point determination section adapted to detect a finger located between a camera and a screen from an image obtained by the camera, and determine a fingertip of the finger, a linear pattern display section adapted to make a projector display a linear pattern on an epipolar line which passes through the fingertip and is determined from a positional relationship between the camera and a projector, and a pattern determination section adapted to determine, from an image including the linear pattern obtained by the camera, a difference between the linear pattern included in that image, and the linear pattern in a case in which the fingertip is absent.

17 Claims, 21 Drawing Sheets

(51) Int. Cl.
| | |
|---|---|
| *G01B 11/25* | (2006.01) |
| *G06F 3/03* | (2006.01) |
| *G06T 7/73* | (2017.01) |
| *G06T 7/521* | (2017.01) |
| *G01B 11/00* | (2006.01) |
| *G03B 21/00* | (2006.01) |

(52) U.S. Cl.
CPC .......... *G06F 3/0304* (2013.01); *G06F 3/0317* (2013.01); *G06F 3/0421* (2013.01); *G06T 7/521* (2017.01); *G06T 7/73* (2017.01); *G06T 7/74* (2017.01); *H04N 9/3179* (2013.01); *H04N 9/3194* (2013.01); *G03B 21/00* (2013.01); *G03B 2206/00* (2013.01); *G06F 2203/04101* (2013.01); *G06T 2207/10016* (2013.01); *G06T 2207/10048* (2013.01); *G06T 2207/10152* (2013.01)

(58) Field of Classification Search
CPC .... H04N 9/3194; H04N 9/3179; G01B 11/25; G01B 11/002; G03B 2206/00; G03B 21/00; G06T 2207/10048; G06T 2207/10152; G06T 7/74; G06T 7/521; G06T 7/73; G06T 2207/10016
See application file for complete search history.

(56) References Cited

U.S. PATENT DOCUMENTS

| | | |
|---|---|---|
| 2007/0131850 A1 | 6/2007 | Cofer et al. |
| 2008/0106746 A1 | 5/2008 | Shpunt et al. |
| 2009/0096783 A1 | 4/2009 | Shpunt et al. |
| 2010/0177164 A1 | 7/2010 | Zalevsky et al. |
| 2011/0158508 A1 | 6/2011 | Shpunt et al. |
| 2011/0254810 A1 | 10/2011 | Lee et al. |
| 2012/0281240 A1 | 11/2012 | Cohen et al. |
| 2013/0136305 A1 | 5/2013 | Shpunt et al. |
| 2013/0155195 A1 | 6/2013 | Zalevsky et al. |
| 2015/0287205 A1 | 10/2015 | Zalevsky et al. |

FOREIGN PATENT DOCUMENTS

| | | | |
|---|---|---|---|
| JP | 2009-511897 A | | 3/2009 |
| JP | 2014-115108 A | | 6/2014 |
| JP | 2014115108 A | * | 6/2014 |
| JP | 2017-126182 A | | 7/2017 |
| JP | 2017-126192 A | | 7/2017 |
| JP | 2017-181281 A | | 10/2017 |

OTHER PUBLICATIONS

Mar. 14, 2017 International Search Report issued in International Patent Application No. PCT/JP2016/088863.

* cited by examiner

IMAGE RECOGNITION DEVICE, IMAGE RECOGNITION METHOD AND IMAGE RECOGNITION UNIT

TECHNICAL FIELD

The present invention relates to an image recognition device, an image recognition method and an image recognition unit.

BACKGROUND ART

As an image recognition technology for detecting whether or not a finger has contact with a screen on which an image from a projector is projected, there is known a technology of PTL 1. In the image recognition technology of PTL 1, firstly, structured light having a lattice pattern is projected on the screen, and then a change in the lattice pattern at the position of the finger described above is recognized based on the image from an imaging device (a camera) to thereby perform touch recognition.

CITATION LIST

Patent Literature

PTL 1: US 2011/0254810

SUMMARY OF INVENTION

Technical Problem

However, in the image recognition technology described in PTL 1, the position detection accuracy in the depth direction of the finger viewed from the imaging device is low, and accordingly, there is a problem that the accuracy of the touch recognition is also low.

An object of the invention is to provide an image recognition device, an image recognition method and an image recognition unit capable of performing the touch recognition high in accuracy.

Solution to Problem

Such an object is achieved by the following aspects of the invention.

An image recognition device according to the invention is an image recognition device used in an image display unit including an imaging device adapted to image an image display surface, and a detecting image display device adapted to display a detecting image on the image display surface, the image recognition device including a measurement point determination section adapted to detect an object located between the imaging device and the image display surface from an image obtained by the imaging device to determine a measurement target point of the object, a linear pattern display section adapted to make the detecting image display device display a linear pattern provided with a periodic pattern on an epipolar line which is determined from a positional relationship between the imaging device and the detecting image display device, and passes through the measurement target point, and a pattern determination section adapted to determine, from an image obtained by the imaging device and including the linear pattern, a difference between the linear pattern included in the image and the linear pattern in a case in which the object is absent.

Thus, it is possible to perform the touch recognition (determination on whether or not the object has contact with the image display surface) with high accuracy based on the determination result of the pattern determination section.

In the image recognition device according to the invention, it is preferable that the pattern determination section determines continuity of the linear pattern.

As described above, by determining the continuity of the linear pattern, it is possible to perform the touch recognition with higher accuracy.

In the image recognition device according to the invention, it is preferable that the linear pattern has a first linear pattern having luminance varying with a first pitch.

Thus, the configuration of the linear pattern becomes simple.

In the image recognition device according to the invention, it is preferable that the linear pattern has a first linear pattern having luminance varying with a first pitch, and a second linear pattern having luminance varying with a second pitch different from the first pitch.

Thus, it is possible to perform the touch recognition higher in accuracy.

In the image recognition device according to the invention, it is preferable that the first linear pattern and the second linear pattern are displayed at respective time points different from each other.

Thus, since it is possible to display the first linear pattern and the second linear pattern at the same position, it is possible to perform the touch recognition higher in accuracy.

In the image recognition device according to the invention, it is preferable that the first linear pattern and the second linear pattern are displayed so as to be arranged side by side in a direction crossing the epipolar line.

Thus, since the first linear pattern and the second linear pattern can be displayed at the same time, it is possible to shorten the period of the touch recognition.

In the image recognition device according to the invention, it is preferable that the linear pattern is generated using infrared light.

Thus, the linear pattern is not viewed, and there is no chance that, for example, the image displayed on the image display surface is deteriorated due to the linear pattern.

In the image recognition device according to the invention, it is preferable that the linear pattern includes a line segment having a part tilted with respect to the epipolar line.

Thus, it is possible to more accurately determine the difference between the linear patterns, and the touch recognition higher in accuracy becomes possible.

In the image recognition device according to the invention, it is preferable that the image display unit has an illumination light irradiation device adapted to irradiate the image display surface with illumination light, and the measurement point determination section detects the object from an image including the illumination light obtained by the imaging device.

Thus, it is possible to accurately detect the object.

In the image recognition device according to the invention, it is preferable that the illumination light has a pattern having luminance periodically varying along an extending direction of the epipolar line.

Thus, it is possible to accurately detect the object.

In the image recognition device according to the invention, it is preferable that an address used for identifying a position is assigned to each part of the pattern varying periodically of the illumination light.

Thus, since it is sufficient to display the linear pattern only in the vicinity of the address where the object has been detected, the determination of the difference in the linear pattern can be performed in a short period of time. Further, since the pitch of the linear pattern can be shortened, it is possible to accurately detect the object.

An image recognition method according to the invention is an image recognition method used in an image display unit including an imaging device adapted to image an image display surface, and a detecting image display device adapted to display a detecting image on the image display surface, the image recognition method including a measurement point determination step adapted to detect an object located between the imaging device and the image display surface from an image obtained by the imaging device to determine a measurement target point of the object, a linear pattern display step adapted to make the detecting image display device display a linear pattern having luminance varying periodically on an epipolar line which passes through the measurement target point, and is determined from a positional relationship between the imaging device and the detecting image display device, and a pattern determination step adapted to determine, from an image obtained by the imaging device and including the linear pattern, a difference between the linear pattern included in the image and the linear pattern in a case in which the object is absent.

Thus, it is possible to perform the touch recognition with high accuracy based on the determination result in the pattern determination step.

An image recognition unit according to the invention includes the image recognition device according to the invention, the imaging device, and the detecting image display device.

Thus, it is possible to obtain the image recognition unit capable of performing the touch recognition with high accuracy.

In the image recognition unit according to the invention, it is preferable to further include an image display device adapted to display an image on the image display surface.

Thus, it is possible to display a desired image on the image display surface.

DESCRIPTION OF EMBODIMENTS

Some preferred embodiments of the image recognition device, the image recognition method and the image recognition unit according to the invention will hereinafter be described with reference to the accompanying drawings.

First Embodiment

Firstly, an image recognition unit according to a first embodiment will be described.

Figure 1:
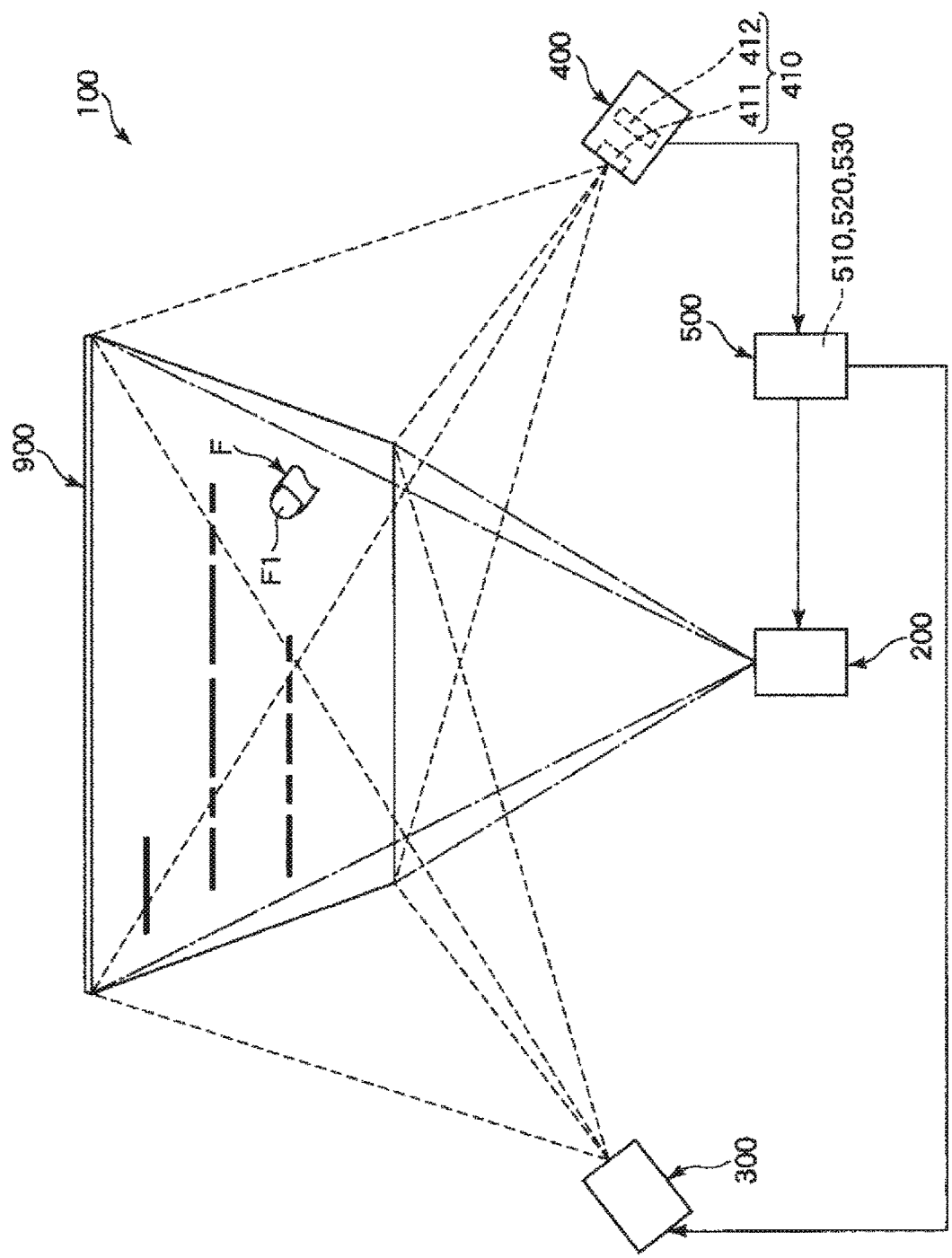
FIG. 1 is a diagram showing a configuration of an image recognition unit according to a first embodiment of the invention.
Figure 2:
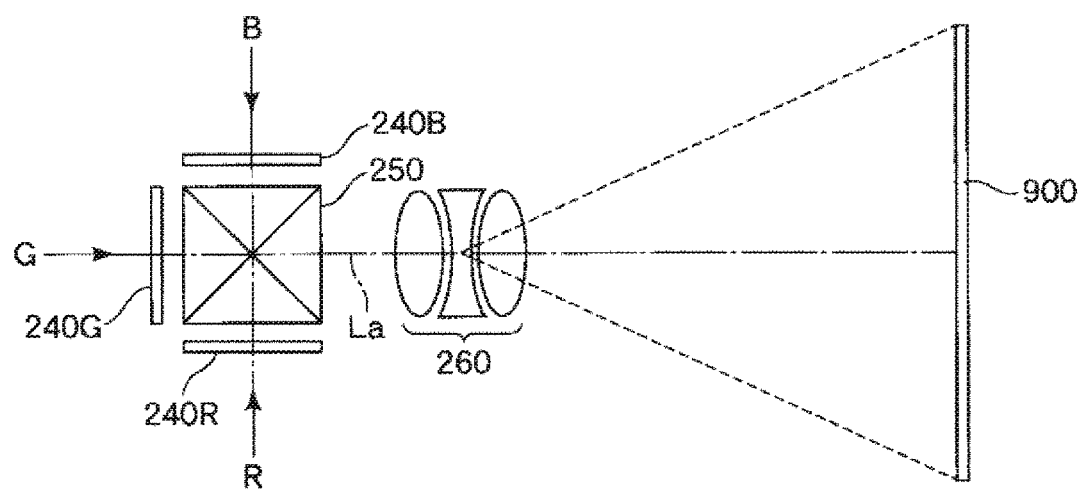
FIG. 2 is a configuration diagram of the projector shown in FIG. 1.
Figure 3:
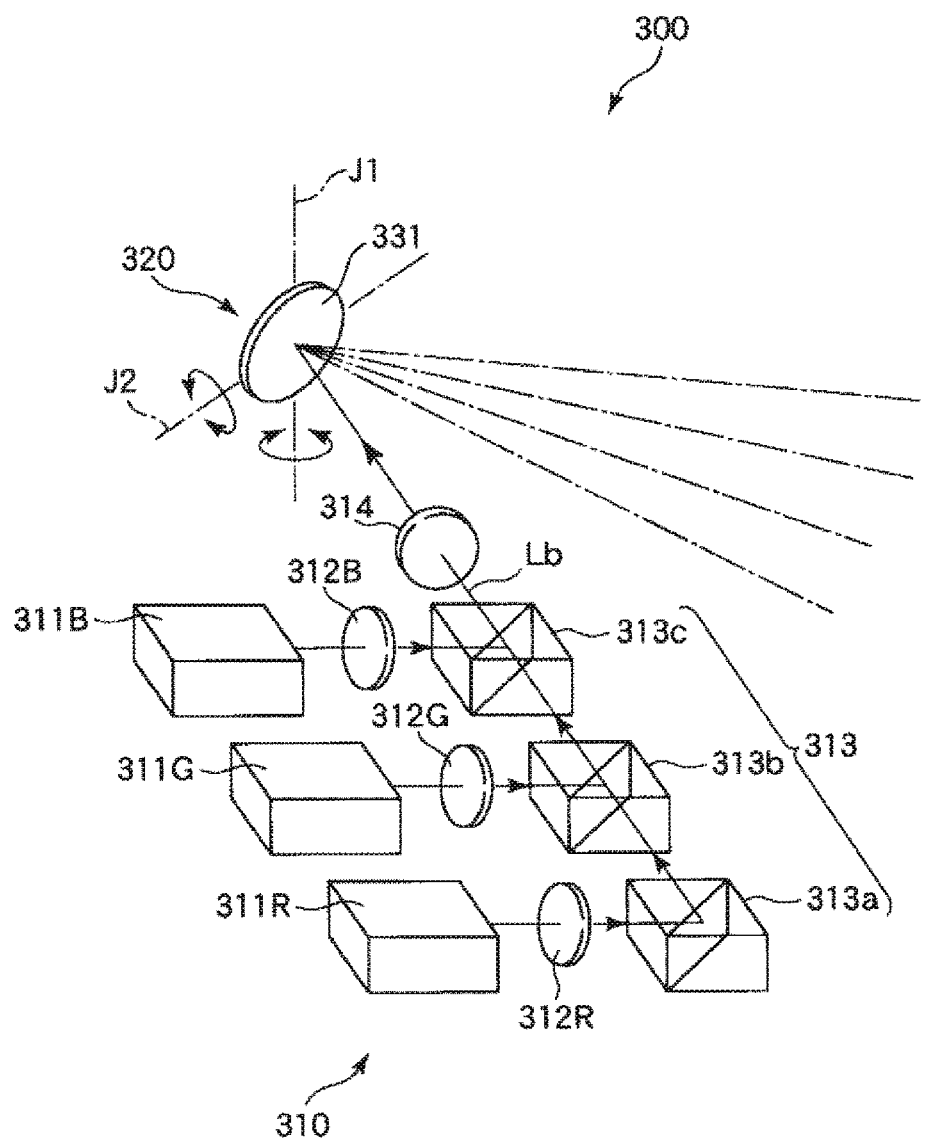
FIG. 3 is a configuration diagram of the projector shown in FIG. 1.
Figure 4:
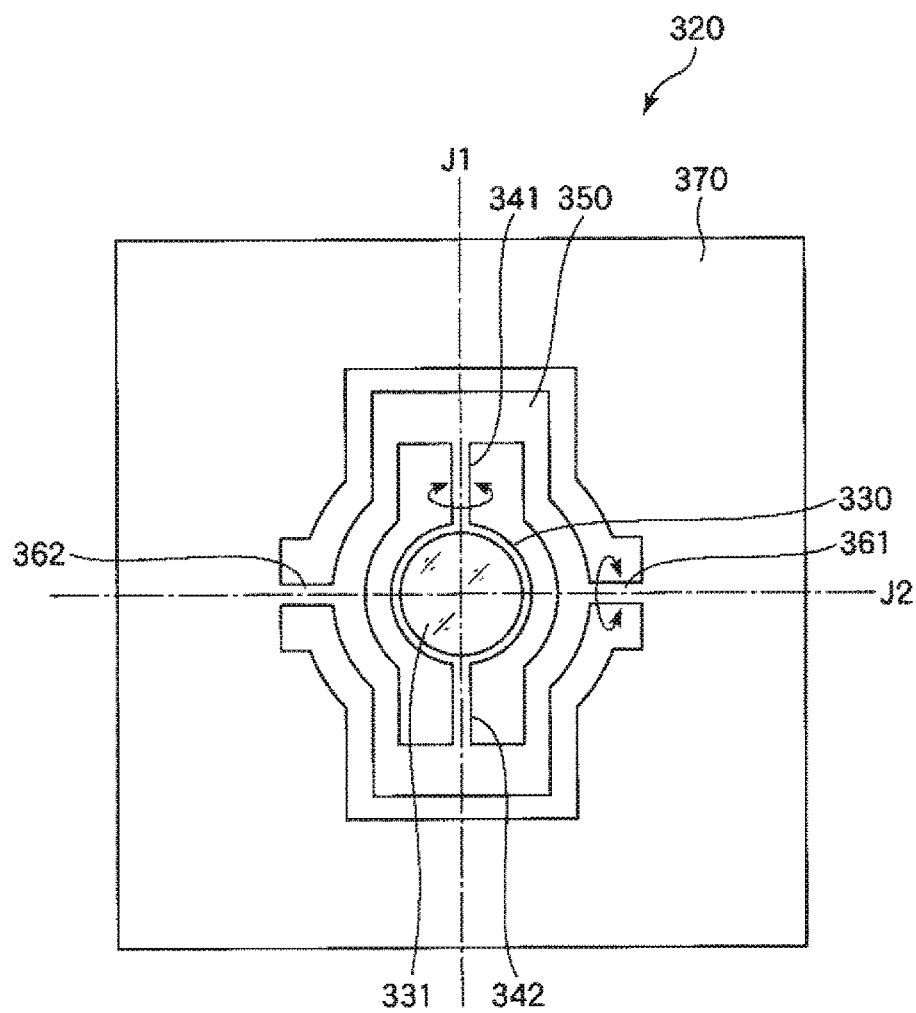
FIG. 4 is a plan view of a scanning section provided to the projector shown in FIG. 3.
Figure 5:
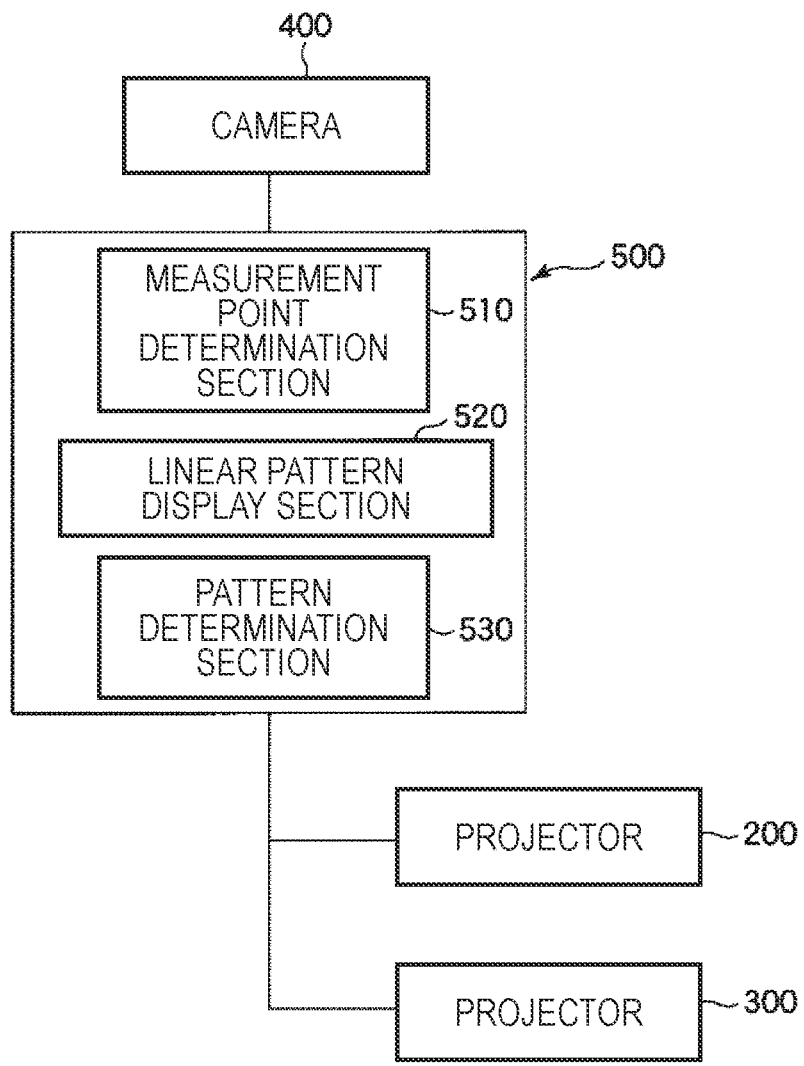
FIG. 5 is a block diagram of the image recognition device shown in FIG. 1.
Figure 6:
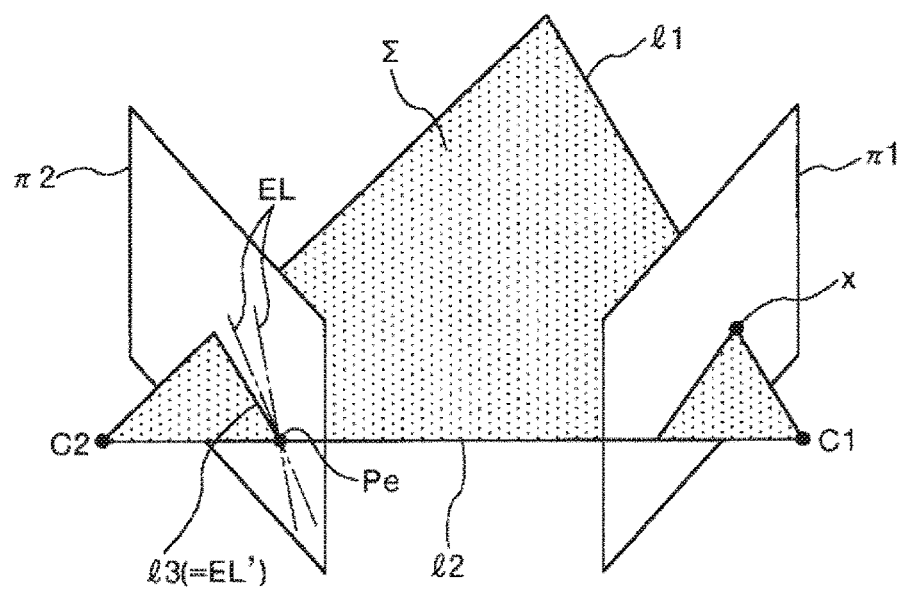
FIG. 6 is a diagram for explaining an epipolar line.
Figure 7:
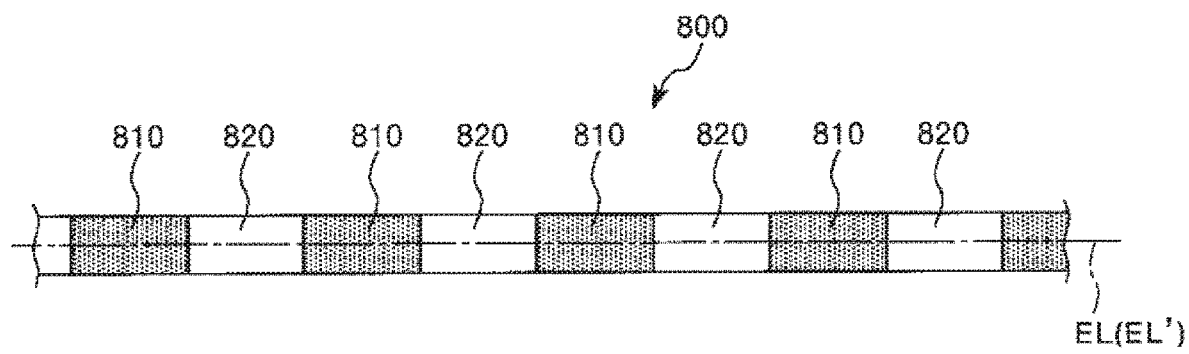
FIG. 7 is a diagram showing a linear pattern.
Figure 8:
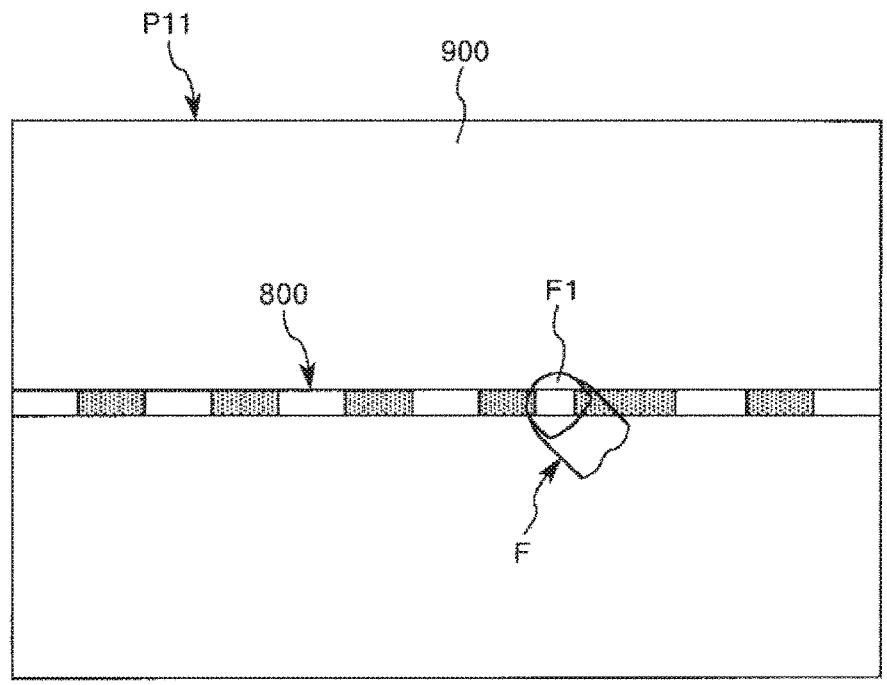
FIG. 8 is a diagram showing an image of the linear pattern obtained in the state in which a fingertip has contact with a screen.
Figure 9:
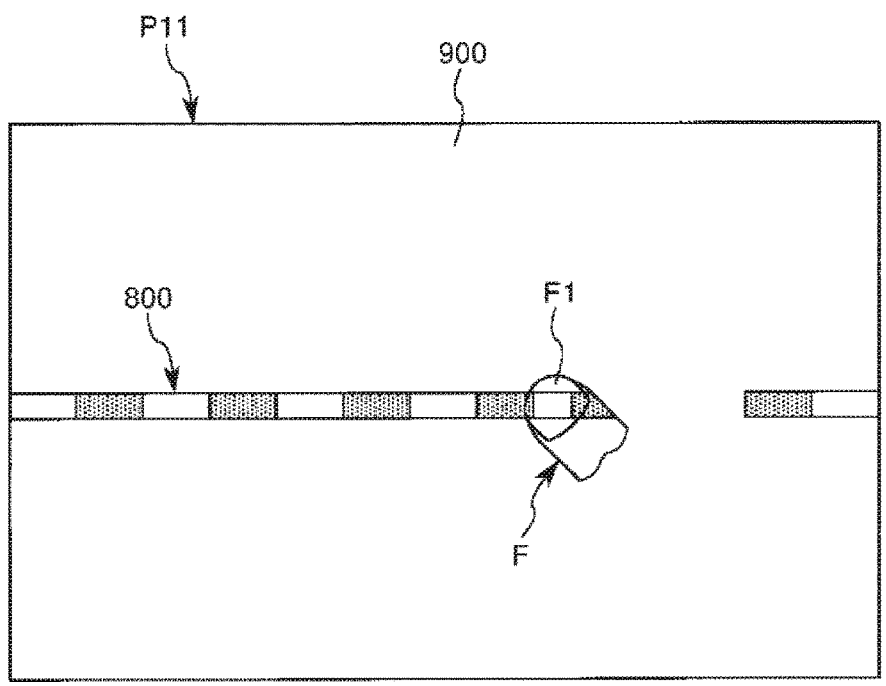
FIG. 9 is a diagram showing an image of the linear pattern obtained in the state in which the fingertip does not have contact with the screen.

FIG. 1 is a diagram showing a configuration of an image recognition unit according to the first embodiment of the invention. FIG. 2 is a configuration diagram of the projector shown in FIG. 1. FIG. 3 is a configuration diagram of the projector shown in FIG. 1. FIG. 4 is a plan view of a scanning section provided to the projector shown in FIG. 3. FIG. 5 is a block diagram of the image recognition device shown in FIG. 1. FIG. 6 is a diagram for explaining an epipolar line. FIG. 7 is a diagram showing a linear pattern. FIG. 8 is a diagram showing an image of the linear pattern obtained in the state in which a fingertip has contact with a screen. FIG. 9 is a diagram showing an image of the linear pattern obtained in the state in which the fingertip does not have contact with the screen.

The image recognition unit 100 shown in FIG. 1 is a device capable of determining whether or not a finger (an object) F has contact with, for example, a flat screen (an image display surface) 900, and then switching an image to be displayed on the screen 900 based on the determination result. It should be noted that the determination on whether or not the finger F has contact with the screen 900 is hereinafter referred to as "touch recognition." Such an image recognition unit 100 can be used for, for example, a presentation, and by performing the touch recognition of the finger of a presenter to switch, expand, or shrink an image to be displayed on the screen 900 as needed, it becomes possible to smoothly progress the presentation.

It should be noted that the image display surface is not limited to the screen 900, but can also be, for example, a wall or a glass. Further, the image display surface is not required to be flat, but can also be a spherical surface or an uneven surface. Further, the image display surface can change in shape with time. Further, the object on which the tough recognition is performed is not limited to the finger F, but can also be, for example, a pointer stick, or a magnet adhering to the screen 900. Further, the use application of the image recognition unit 100 is not limited to presentations, but the image recognition unit 100 can be used for a variety of applications such as a store guide of a department store, or introduction and search for a line of business.

As shown in FIG. 1, such an image recognition unit 100 has an image display unit having a projector (an image display device) 200 for displaying an image on the screen 900, a projector (detecting image display device) 300 for displaying a detecting image on the screen 900, and a camera (an imaging device) 400 for imaging the screen 900, and an image recognition device 500 for performing the touch recognition.

The projector 300 and the camera 400 are disposed at positions different from each other. Further, the relative (geometric) positional relationship between the projector 300 and the camera 400 is constant, and the information related to the positional relationship is stored in a storage section not shown and provided to the image recognition device 500, and is used arbitrarily.

Hereinafter, the projector 200, the projector 300, the camera 400 and the image recognition device 500 will sequentially be described.

[Projector 200]

The projector 200 is a device for displaying an image (e.g., an image for a presentation) intended to be recognized by an observer on the screen 900.

Such a projector 200 is an LCD type projector, and is provided with liquid crystal display elements 240R, 240G, 240B, a dichroic prism 250, and a projection lens system 260 as shown in FIG. 2. Then, red light R enters the liquid crystal display element 240R, green light G enters the liquid crystal display element 240G, and blue light B enters the liquid crystal display element 240B.

The liquid crystal display elements 240R, 240G, 240B are transmissive spatial light modulators corresponding respectively to the primary colors of R, G, and B, and the light beams spatially modulated by the respective liquid crystal display elements 240R, 240G, 240B are combined with each other by the dichroic prism 250, and thus full-color picture light La is emitted from the dichroic prism 250. Then, the picture light La thus emitted is enlarged and projected on the screen 900 by the projection lens system 260. Thus, an image is displayed on the screen 900.

The projector 200 is hereinabove described, but is not limited to the LCD type projector providing the projector 200 is capable of displaying an image on the screen 900, and can also be, for example, a light scanning type projector, or a DMD type projector.

[Projector 300]

The projector 300 is a device for displaying the detecting image (a linear pattern 800 described later) for performing the touch recognition on the screen 900.

Such a projector 300 is a light scanning type projector, and is provided with a light source 310, a scanning section 320, and a projection lens system not shown as shown in FIG. 3.

The light source 310 has a light source 311R for emitting a red laser beam, a light source 311G for emitting a green laser beam, a light source 311B for emitting a blue laser beam, collimator lenses 312R, 312G, 312B for respectively collimating the light beams emitted from the light sources 311R, 311G, 311B, a light combining section 313, and a collecting lens 314.

The light combining section 313 is an element for combining the laser beams from the light sources 311R, 311G, 311B with each other to generate the modulated light Lb, and has three dichroic mirrors 313a, 313b, 313c. Further, the modulated light Lb generated by the light combining section 313 is changed to have a desired NA (numerical aperture) by the collecting lens 314, and is then guided to the scanning section 320.

The scanning section 320 is an optical scanner capable of oscillating around two axes, and has a movable section 330 having a mirror 331, shaft sections 341, 342 for supporting the movable section 330 so as to be able to oscillate around an axis J1, a drive frame section 350 for supporting the shaft sections 341, 342, shaft sections 361, 362 for supporting the drive frame section 350 so as to be able to oscillate around an axis J2 perpendicular to the axis J1, and a support section 370 having a frame-like shape for supporting the shaft sections 361, 362 as shown in FIG. 4. In such a scanning section 320, by oscillating the movable section 330 around the axis J1 with respect to the drive frame section 350 while oscillating the drive frame section 350 around the axis J2 with respect to the support section 370 using a driver not shown, it is possible to perform two-dimensional scan with the modulated light Lb reflected by the mirror 331.

Then, the modulated light Lb with which the scan is performed by the scanning section 320 is enlarged and projected on the screen 900 by the projection lens system not shown. Thus, the linear pattern 800 is displayed on the screen 900.

The projector 300 is hereinabove described, but is not limited to the light scanning type projector providing the projector 300 is capable of displaying the linear pattern 800 on the screen 900, and can also be, for example, the LCD type projector or a DMD type projector. Further, even in the case of the light scanning type projector, the configuration described above is not a limitation, and it is also possible to perform two-dimensional scan with the modulated light Lb using, for example, two single-axis oscillation type optical scanners.

[Camera 400]

The camera 400 is a device for imaging the screen 900. Such a camera 400 is, for example, an RGB camera, and has a light receiving unit 410 provided with a lens system 411 and an imaging element 412, and a processing section not shown for processing a video signal from the imaging element 412.

[Image Recognition Device]

The image recognition device 500 is a device for performing the touch recognition using the projector 300 and the camera 400 described above.

As shown in FIG. 5, such an image recognition device 500 has a measurement point determination section 510, a linear pattern display section 520, and a pattern determination section 530.

The measurement point determination section 510 detects the finger F located between the camera 400 and the screen 900 from the image obtained by the camera 400, and further, determines the fingertip F1 of the finger F as a measurement target point (a measurement point determination step). The determination method of the fingertip F1 is not particularly limited, but a variety of methods can be used. For example, it is possible to extract a flesh-color-like area (an area having a color similar to the color of the finger F) using the HSV color system from the image obtained by the camera 400, further, detect a part having a similar contour shape to the fingertip F1 from the contour shape of the flesh-color-like area thus extracted to determine the part thus detected as the fingertip F1.

The linear pattern display section 520 makes the projector 300 display the linear pattern 800 on the epipolar line EL (EL') passing through the fingertip F1 (a linear pattern display step).

Here, the epipolar line EL will briefly be described. The epipolar line EL is a line determined by a geometric (relative) positional relationship between the projector 300 and the camera 400. Specifically, as shown in FIG. 6, an intersection point between a straight line (base line) 12 connecting the camera center (principal point of the lens system 411) C1 of the camera 400 and the angle alteration center (the center of the mirror 331) C2 when performing the scan with the modulated light Lb of the scanning section 320, and a virtual image plane $\pi 2$ of the projector 300 is referred to as an epipolar point Pe, and all of the straight lines passing through the epipolar point Pe in the virtual image plane $\pi 2$ are referred to as epipolar lines EL.

Further, as shown in FIG. 6, if the fingertip F1 is included in the image of the camera 400, the coordinate (in-plane coordinate) x of the fingertip F1 in an image plane $\pi 1$ of the camera 400 is determined. The plane defined by the straight line l1 passing through the coordinate x and the camera center C1, and the straight line l2 is referred to as an epipolar plane $\Sigma$. Further, in the case of defining the epipolar line EL coinciding with a straight line l3, which is obtained by the epipolar plane $\Sigma$ and the virtual image plane $\pi 2$ intersecting with each other, as the "epipolar line EL'," the fingertip F1 is located somewhere on the epipolar line EL' as a result.

As shown in FIG. 7, the linear pattern 800 has a periodic pattern, and the luminance periodically varies at regular intervals. Specifically, the linear pattern 800 is a pattern having first regions 810 having a predetermined luminance, and second regions 820 having a different luminance from that of the first regions 810 alternately arranged at regular intervals. The luminance of the first regions 810 and the luminance of the second regions 820 are set so that the contrast ratio becomes as high as possible. Thus, the touch recognition higher in accuracy becomes possible. It should be noted that the linear pattern is not limited to the above pattern providing the linear pattern 800 can be used for the touch recognition, and can be provided with, for example, third regions different in luminance from the first and second regions 810, 820, or can also be a pattern having a luminance gradient (continuously varying in luminance).

The pattern determination section 530 determines the difference (variation) in pattern between the linear pattern 800 projected on the screen 900 in the state of including the fingertip F1 and the linear pattern 800 projected on the screen 900 in the state in which the fingertip F1 is not present, and then performs the touch recognition based on the determination result (a pattern determination step). As an example of the pattern determination, it is possible for the pattern determination section 530 to determine the continuity of the linear pattern 800 projected on the screen 900 from the image obtained by the camera 400 to perform the touch recognition based on the determination result. As described above, by determining the continuity of the linear pattern 800, the touch recognition higher in accuracy becomes possible.

Specifically, firstly, the pattern determination section 530 obtains an image (hereinafter also referred to as a "stereo-rectified image") obtained by stereo-collimating the image obtained by the camera 400. As shown in FIG. 8 and FIG. 9 described later, in the stereo-rectified image, all of the epipolar lines EL become lines parallel to the horizontal direction (the lateral direction in the sheet) irrespective of the unevenness of the surface of the screen 900, the shape of the fingertip F1, and so on. Therefore, it results that the linear pattern 800 also becomes parallel to the horizontal direction, and it is possible to easily and accurately perform the determination of the difference in the linear pattern 800.

Then, the pattern determination section 530 determines the difference (e.g., the continuity) of the linear pattern 800 in the stereo-rectified image to perform the touch recognition. It should be noted that since the position of the fingertip F1 in the stereo-rectified image is known, there is no need to determine the difference in pattern for the entire area of the linear pattern 800, but it is sufficient to determine the difference in pattern only for the region adjacent to the fingertip F1. Thus, it is possible to reduce the calculation load.

In the stereo-rectified image P11 in the case in which the fingertip F1 has contact with the screen 900 (i.e., the case in which the depth of the fingertip F1 roughly coincides with the depth of the screen 900), the linear pattern 800 has a continuous shape as shown in FIG. 8. In contrast, in the stereo-rectified image P11 in the case in which the fingertip F1 does not have contact with the screen 900, the linear pattern 800 is partially shadowed by the fingertip F1 to have a shape broken in the middle thereof as shown in FIG. 9. Further, in the linear pattern 800, there occurs discontinuity of the pitch in the periphery of the fingertip F1. Therefore, the pattern determination section 530 determines the "contact state" in which the fingertip F1 has contact with the screen 900 if the linear pattern 800 has the continuity in the stereo-rectified image P11, and determines the "non-contact state" in which the fingertip F1 does not have contact with the screen 900 if the linear pattern 800 does not have the continuity.

It should be noted that the determination method of the pattern determination section 530 is not limited to the above. For example, in some cases, the shadow occurs irrespective of the fact that the fingertip F1 has contact with the screen 900 depending on the position of the projector 300, and the shape and the size (individual difference) of the fingertip F1. Therefore, it is also possible to set a threshold value for the length of the shadow part, and determine the "contact state" if the length of the shadow part is shorter than the threshold value, and determine the "non-contact state" if the length of the shadow part is equal to or longer than the threshold value.

In the case in which the determination result is the "contact state," the pattern determination section 530 transmits the determination result to a control section not shown. The control section having received the determination result transmits a screen operation commend determined in accordance with the contact position of the fingertip F1 such as a command for expanding or contracting the image displayed on the screen 900, or a command for switching the image. By performing such control, it is possible to operate the image displayed on the screen 900 only by touching the screen 900 with the fingertip F1, and therefore, the image recognition unit 100 high in convenience is obtained.

As described above, it is the procedure (image recognition method) of the touch recognition by the image recognition device 500 to perform the measurement point determination step, the linear pattern display step, and the pattern determination step, and by repeatedly performing the procedure with a predetermined period, it is possible to repeatedly perform the touch recognition.

For example, firstly, the stereo-rectified image $P_n$ of an n-th frame is obtained (step 1). Then, the position of the fingertip F1 in the stereo-rectified image $P_n$ is determined (step 2). Then, the linear pattern 800 passing through the fingertip F1 determined in the stereo-rectified image $P_n$ is displayed (step 3). Then, in the state in which the linear pattern 800 is displayed, the stereo-rectified image $P_{n+1}$ of an n+1-th frame is obtained (step 4). Then, the difference in the linear pattern 800 is determined in the stereo-rectified image $P_{n+1}$ to perform the touch recognition at the time point when the stereo-rectified image $P_{n+1}$ is obtained, and at the same time, determine the position of the fingertip F1 in the stereo-rectified image $P_{n+1}$ (step 5). Then, the linear pattern 800 passing through the fingertip F1 determined in the stereo-rectified image $P_{n+1}$ is displayed (step 6). Then, in the state in which the linear pattern 800 is displayed, the stereo-rectified image $P_{n+2}$ of an n+2-th frame is obtained (step 7). Then, the difference in the linear pattern 800 is determined in the stereo-rectified image $P_{n+2}$ to perform the touch recognition at the time point when the stereo-rectified image $P_{n+2}$ is obtained, and at the same time, determine the position of the fingertip F1 in the stereo-rectified image $P_{n+2}$ (step 8). By repeating such steps, the continuous touch recognition becomes possible. In particular, by performing the touch recognition and the position determination of the fingertip F1 using one image as in the steps 5, 8, it is possible to shorten the period of the touch recognition, and thus, the touch recognition shorter in delay time becomes possible.

According to such an image recognition device 500, the calculation load can be reduced, and at the same time, the touch recognition high in accuracy becomes possible. Further, the epipolar line EL is a line which can be obtained in accordance with the geometric positions of the projector 300 and the camera 400 irrespective of the three-dimensional position and the surface shape of the screen 900. Therefore, once the geometric positions of the projector 300 and the camera 400 are set, it is possible to perform the touch recognition without being affected by the position and the shape of the screen 900.

Second Embodiment

Then, an image recognition unit according to a second embodiment of the invention will be described.

Figure 10:
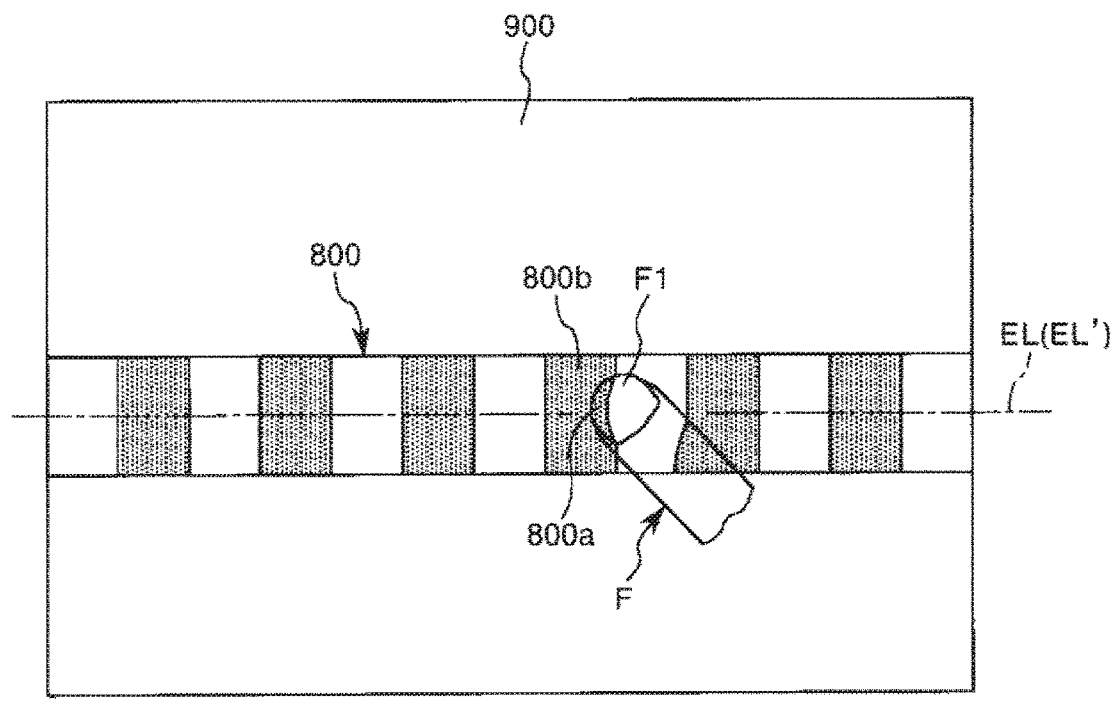
FIG. 10 is a diagram showing a linear pattern used in an image recognition unit according to a second embodiment of the invention.

FIG. 10 is a diagram showing a linear pattern used in the image recognition unit according to the second embodiment of the invention.

Hereinafter, the image recognition unit according to the second embodiment of the invention will be described wherein the description will be presented with a focus mainly on the differences from the embodiment described above, and the description regarding substantially the same matters will be omitted.

The image recognition unit according to the second embodiment is substantially the same as the first embodiment described above except the point that the linear pattern is different. It should be noted that the constituents substantially the same as those of the embodiment described above are denoted by the same reference symbols.

The linear pattern 800 in the present embodiment is widened in width than the fingertip F1 as in the stereo-rectified image shown in FIG. 10. Therefore, in the linear pattern 800, there are formed the region 800*a* projected on the fingertip F1 and the region 800*b* projected on the screen 900 so as to be arranged side by side in the width direction of the epipolar line EL, and it is possible to generate a variation of the pattern in the boundary part between the regions 800*a*, 800*b*. Therefore, it is possible to figure out (distinguish) whether the variation of the linear pattern 800 generated in the vicinity of the fingertip F2 is, for example, what is generated due to the unevenness of the surface of the screen 900 (a variation with continuity), or what is generated due to the fingertip F1 (a discontinuous variation). By additionally using such information, it becomes possible to more accurately perform the touch recognition.

According also to such a second embodiment as described hereinabove, substantially the same advantages as in the first embodiment described above can be exerted.

Third Embodiment

Then, an image recognition unit according to a third embodiment of the invention will be described.

Figure 11:
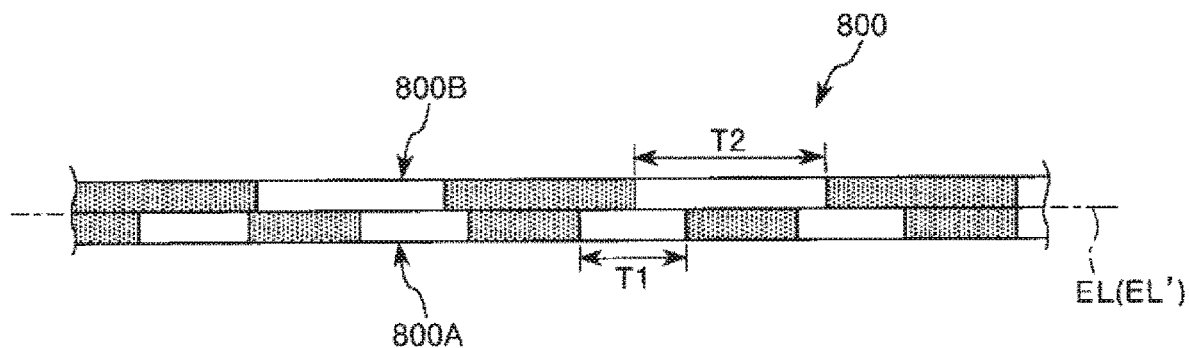
FIG. 11 is a diagram showing a periodic pattern used in an image recognition unit according to a third embodiment of the invention.
Figure 12:
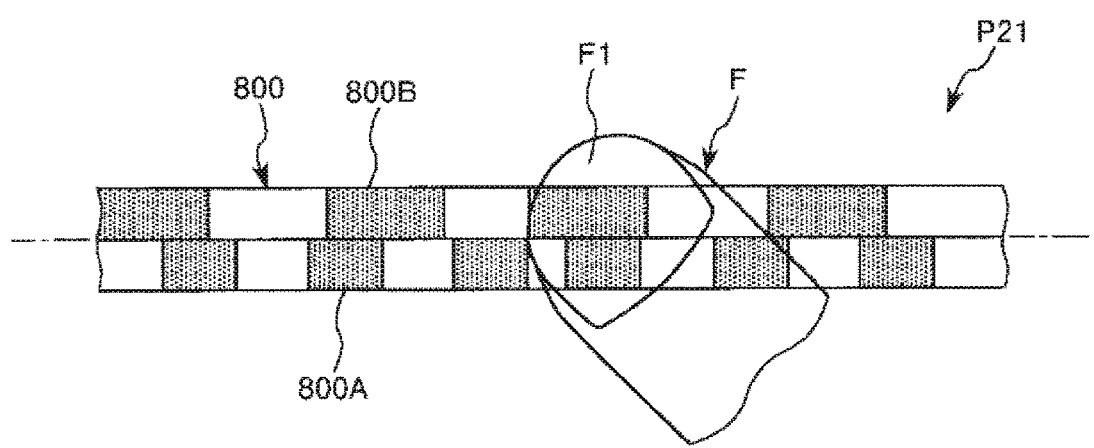
FIG. 12 is a diagram for explaining a method of touch recognition using the linear pattern shown in FIG. 11.
Figure 13:
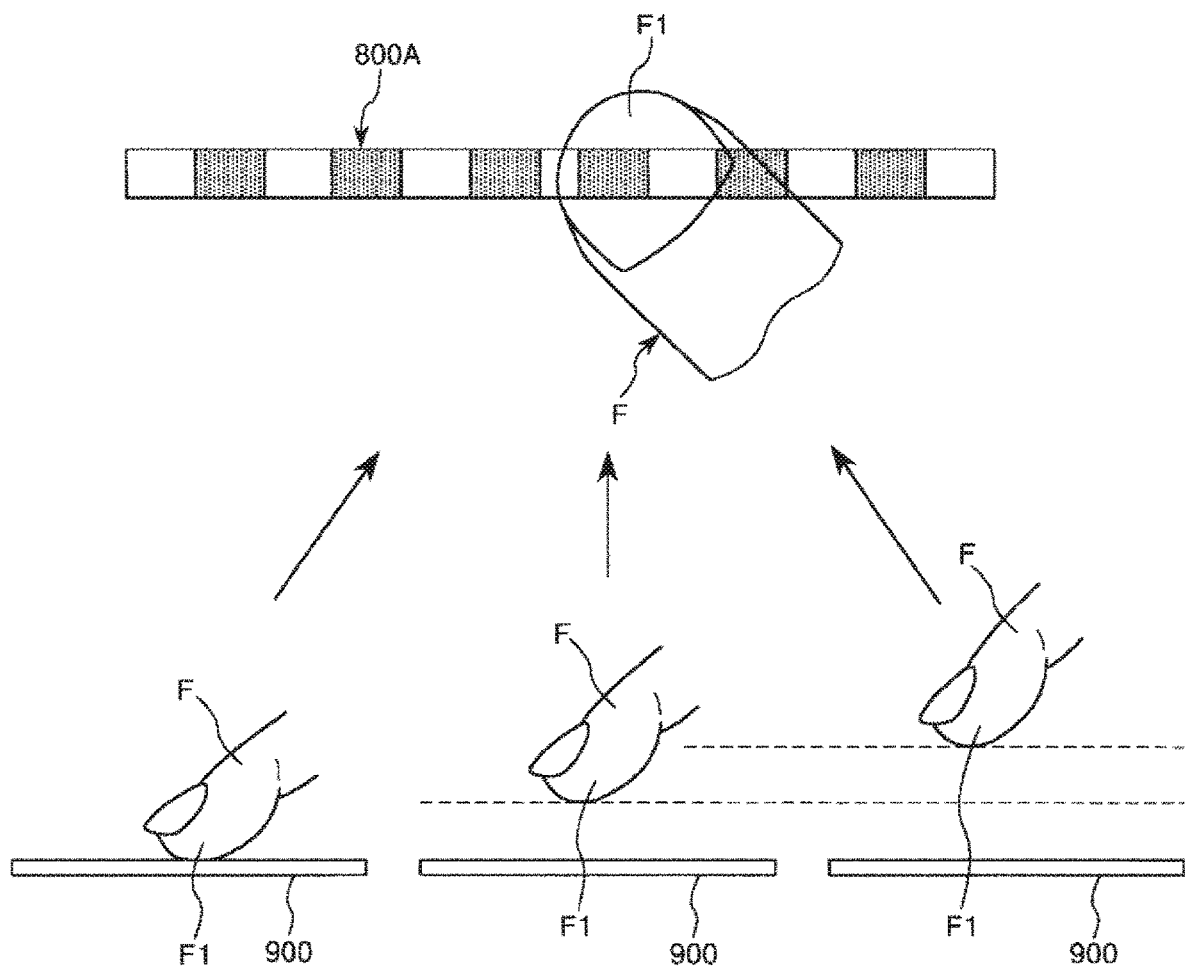
FIG. 13 is a diagram for explaining a method of touch recognition using the linear pattern shown in FIG. 11.

FIG. 11 is a diagram showing a periodic pattern used in the image recognition unit according to the third embodiment of the invention. FIG. 12 and FIG. 13 are diagrams for explaining a method of the touch recognition using the linear pattern shown in FIG. 11.

Hereinafter, the image recognition unit according to the third embodiment of the invention will be described wherein the description will be presented with a focus mainly on the differences from the embodiment described above, and the description regarding substantially the same matters will be omitted.

The image recognition unit according to the third embodiment is substantially the same as the first embodiment described above except the point that the linear pattern is different. It should be noted that the constituents substantially the same as those of the embodiment described above are denoted by the same reference symbols.

In the first embodiment described above, the touch recognition is performed by determining the continuity of the linear pattern 800. However, depending on the pitch of the linear pattern 800 or the surrounding environment, there can be the case in which it is difficult to stably determine the continuity (i.e., the presence of the shadow or the discontinuous pitch) of the linear pattern 800. Therefore, in the present embodiment, the touch recognition is performed by detecting the depth (the position in the depth direction of the image) of the fingertip F1 based mainly on the pitch fluctuation (pattern shift) of the linear pattern 800 between the screen 900 and the fingertip F1. Hereinafter, the specific explanation will be presented.

As shown in FIG. 11, the linear pattern 800 of the present embodiment has a first linear pattern 800A varying in luminance with a constant first pitch T1, and a second linear pattern 800B varying in luminance with a constant second pitch T2 different from the first pitch T1. Further, the first linear pattern 800A and the second linear pattern 800B are arranged side by side in the width direction (a direction crossing the epipolar line EL) of the epipolar line EL (EL'). Further, the first linear pattern 800A and the second linear pattern 800B are located on the opposite sides across the epipolar line EL. In other words, the epipolar line EL is located along the boundary between the first linear pattern 800A and the second linear pattern 800B.

Here, the second pitch T2 is not particularly limited, but is preferably shorter than twice the first pitch T1. If the second pitch T2 is set equal to or longer than twice the first pitch T1, it results that two or more pitches of the first linear pattern 800A are included in one pitch of the second linear pattern 800B. Therefore, depending on the usage environment, there is a possibility that the accuracy of the depth analysis of the fingertip F1 described later is deteriorated. It should be noted that in the present embodiment, the second pitch T2 is made 1.75 times of the first pitch T1. The reason therefor will be described later.

When displaying such a linear pattern 800 on the epipolar line EL', the linear pattern 800 is projected on the screen 900, and at the same time, the linear pattern 800 is projected also on the fingertip F1. Further, between the linear pattern 800 on the screen 900 and the linear pattern 800 on the fingertip F1, there occurs the pitch fluctuation (pattern shift) based on the depth of the fingertip F1.

The pattern determination section 530 detects the depth of the fingertip F1 based on the pitch fluctuation to perform the touch recognition based on the depth thus detected. Specifically, firstly, such a stereo-rectified image P21 as shown in FIG. 12 is obtained. Then, the depth analysis of the first and second linear patterns 800A, 800B reflected on the screen 900 is performed to detect (estimate) the depth at the position overlapping the fingertip F1 of the screen 900, and at the same time, the depth analysis of the first and second linear patterns 800A, 800B reflected on the fingertip F1 is performed to detect the depth of the fingertip F1.

Then, if the depth of the fingertip F1 does not coincide with the depth of the screen 900 in at least one of the analysis result of the first linear pattern 800A and the analysis result of the second linear pattern 800B, the pattern determination section 530 determines the "non-contact state" in which the fingertip F1 does not have contact with the screen 900. In contrast, in the case in which the depth of the fingertip F1 coincides with the depth of the screen 900 in both of the analysis result of the first linear pattern 800A and the analysis result of the second linear pattern 800B, the pattern determination section 530 further performs the following determination.

For example, in the description of the first linear pattern 800A, as shown in FIG. 13, even if the fingertip F1 is separated from the screen 900, in the case in which the way of the separation causes the pitch fluctuation (pattern shift) corresponding to an integral multiple of the pitch of the first linear pattern 800A, there is obtained the same image of the pattern on the fingertip F1 as that in the contact state in which the fingertip F1 has contact with the screen 900 despite the non-contact state (hereinafter this phenomenon is referred to as "phase wrapping"). This similarly applies to the second linear pattern 800B.

Therefore, in the case in which the way of the separation of the fingertip F1 causes the pitch fluctuation corresponding to an integral multiple of the pitch of the first linear pattern 800A, and at the same time causes the pitch fluctuation corresponding to an integral multiple of the pitch of the second linear pattern 800B, the phase wrapping occurs. Therefore, it is necessary to distinguish between the contact state and the state in which the phase wrapping occurs. It should be noted that as described above, the pitch (the second pitch T2) of the length of the second linear pattern 800B is 1.75 times of the pitch (the first pitch T1) of the length of the first linear pattern 800A. By adopting such a relationship, it is possible to make the lowest common multiple of the both pitches relatively large (i.e., 7 times of the first pitch T1, 4 times of the second pitch T2), and therefore, it is possible to make the condition for causing the phase wrapping lower.

The method of distinguishing between the contact state and the state in which the phase wrapping occurs is not particularly limited, but the following method can be cited. That is, since in the stereo-rectified image in the case of the contact state, the fingertip F1 has contact with the screen 900, the shadow of the fingertip F1 does not occur on the screen 900. In contrast, since in the stereo-rectified image in the case in which the phase wrapping occurs, the fingertip F1 is separated from the screen 900, the shadow of the fingertip F1 occurs on the screen 900. Therefore, it is possible for the pattern determination section 530 to determine the "contact state" if the shadow of the fingertip F1 does not occur in the screen 900 in the stereo-rectified image, and determine the "phase wrapping state" in which the phase wrapping occurs if the shadow occurs.

It should be noted that depending on the arrangement of the projector 300 and the camera 400, the shape and the size (the individual difference) of the fingertip F1 and so on, the shadow occurs on the screen 900 despite the contact state in some cases. Therefore, it is also possible to set a threshold value for the width (size) of the shadow, and determine the "contact state" if the width of the shadow is smaller than the threshold value, and determine the "phase wrapping state" if the width of the shadow is equal to or larger than the threshold value.

According to such a configuration, it is possible to reduce the occurrence of the phase wrapping, and it is possible to perform the touch recognition high in accuracy. Conversely, it can be said that the pitches of the first linear pattern 800A and the second linear pattern 800B can be shortened accordingly to the reduction of the occurrence of the phase wrapping, and accordingly, the touch recognition higher in accuracy becomes possible.

According also to such a third embodiment as described hereinabove, substantially the same advantages as in the first embodiment described above can be exerted.

Fourth Embodiment

Then, an image recognition unit according to a fourth embodiment of the invention will be described.

Figure 14:
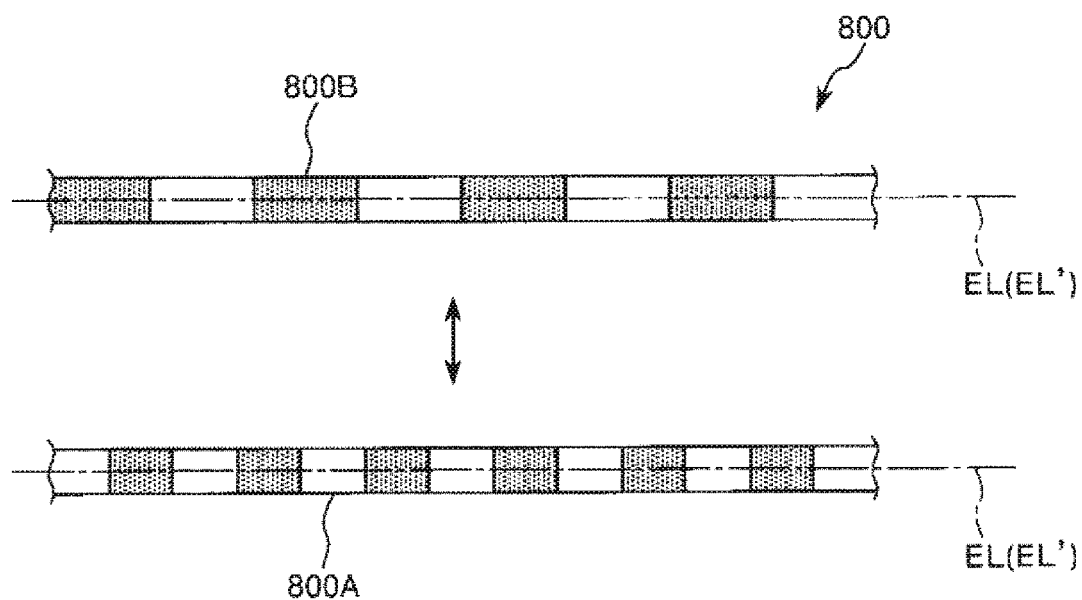
FIG. 14 is a diagram showing a periodic pattern used in an image recognition unit according to a fourth embodiment of the invention.

FIG. 14 is a diagram showing a periodic pattern used in the image recognition unit according to the fourth embodiment of the invention.

Hereinafter, the image recognition unit according to the fourth embodiment of the invention will be described wherein the description will be presented with a focus mainly on the differences from the embodiment described above, and the description regarding substantially the same matters will be omitted.

The image recognition unit according to the fourth embodiment is substantially the same as the third embodiment described above except the point that the linear pattern is different. It should be noted that the constituents substantially the same as those of the embodiment described above are denoted by the same reference symbols.

In the image recognition unit 100 according to the present embodiment, as shown in FIG. 14, the first linear pattern 800A and the second linear pattern 800B are displayed at respective time points different from each other (displayed in a time-sharing manner). Specifically, the first linear pattern 800A and the second linear pattern 800B are displayed alternately with a predetermined period. According to such a configuration, since it is possible to display the first linear pattern 800A and the second linear pattern 800B at the same position, the touch recognition higher in accuracy becomes possible.

According also to such a fourth embodiment as described hereinabove, substantially the same advantages as in the first embodiment described above can be exerted.

Fifth Embodiment

Then, an image recognition unit according to a fifth embodiment of the invention will be described.

Figure 15:
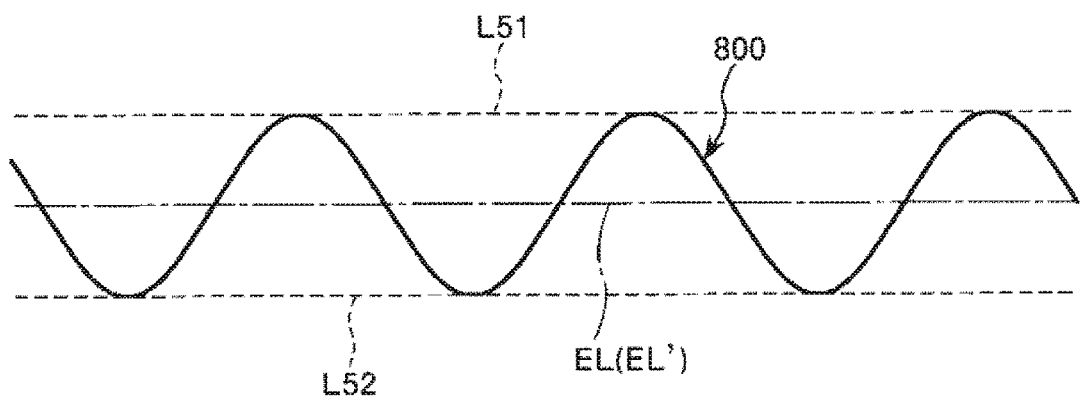
FIG. 15 is a diagram showing a periodic pattern used in an image recognition unit according to a fifth embodiment of the invention.
Figure 16:
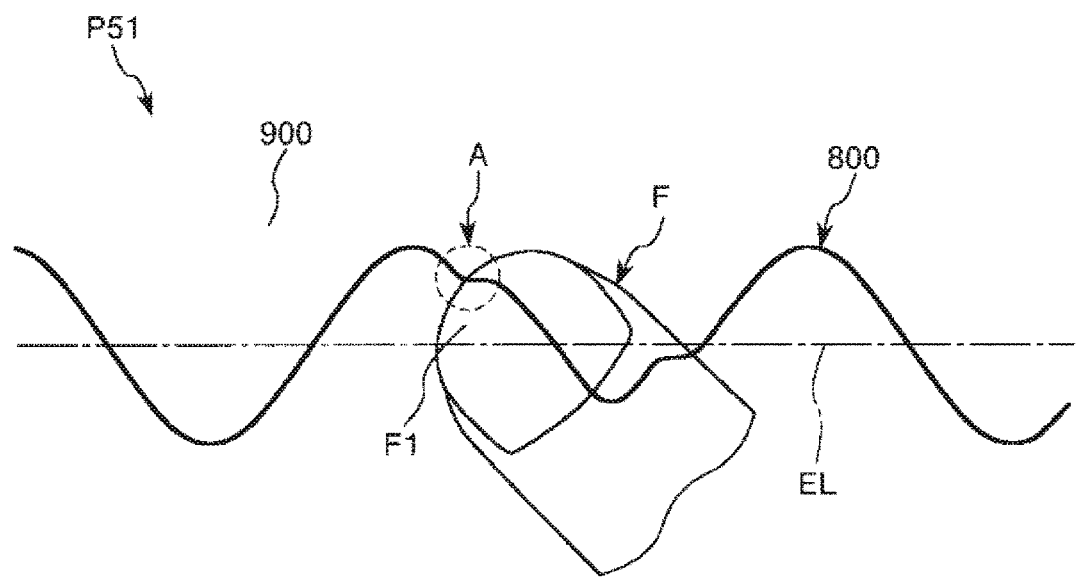
FIG. 16 is a diagram showing an image of the linear pattern obtained in the state in which a fingertip has contact with the screen.
Figure 17:
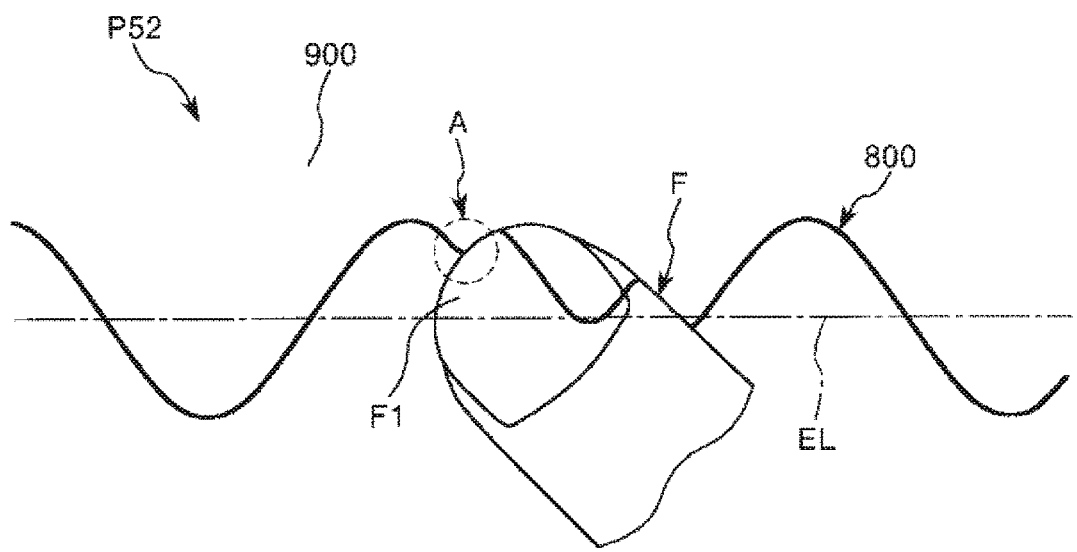
FIG. 17 is a diagram showing an image of the linear pattern obtained in the state in which the fingertip does not have contact with the screen.

FIG. 15 is a diagram showing a periodic pattern used in the image recognition unit according to the fifth embodiment of the invention. FIG. 16 is a diagram showing an image of the linear pattern obtained in the state in which the fingertip has contact with the screen. FIG. 17 is a diagram showing an image of the linear pattern obtained in the state in which the fingertip does not have contact with the screen.

Hereinafter, the image recognition unit according to the fifth embodiment of the invention will be described wherein the description will be presented with a focus mainly on the differences from the embodiment described above, and the explanation regarding substantially the same matters will be omitted.

The image recognition unit according to the fifth embodiment is substantially the same as the first embodiment described above except the point that the linear pattern is different. It should be noted that the constituents substantially the same as those of the embodiment described above are denoted by the same reference symbols.

The linear pattern 800 of the present embodiment includes line segments each having a part (a nonparallel part) tilted from the epipolar line EL (EL'), and has a sinusoidal shape shown in FIG. 15 in the present embodiment. The linear pattern 800 departs from the epipolar line EL on the both sides with the distances equal to each other, and is located between line segments L51, L52 parallel to the epipolar line EL. In other words, in the present embodiment, the peaks of the upward and downward protrusions of the sinusoidal wave are located at the same distance from the epipolar line EL. The separation distance of the line segments L51, L52 is not particularly limited, but it is preferable for the separation distance to be roughly equal to or larger than the width of the fingertip F1.

As described above, when using the line pattern 800 having the part tilted with respect to the epipolar line EL, the touch recognition becomes possible using the following method. In the stereo-rectified image P51 in the case in which the fingertip F1 has contact with the screen 900, the continuity of the linear pattern 800 is roughly maintained although the linear pattern 800 on the fingertip F1 is shifted in the horizontal direction (the lateral direction in the sheet) from the linear pattern 800 on the screen 900 as shown in FIG. 16. In other words, the linear pattern 800 becomes in the continuous state even in the boundary part A between the screen 900 and the fingertip F1.

In contrast, in the stereo-rectified image P52 in the case in which the fingertip F1 does not have contact with the screen 900, the linear pattern 800 on the fingertip F1 is significantly shifted in the horizontal direction from the linear pattern 800 on the screen 900, and the continuity of the linear pattern 800 is lost as shown in FIG. 17. In other words, the linear pattern 800 becomes in the discontinuous state in the boundary part A between the screen 900 and the fingertip F1.

Therefore, it becomes possible for the pattern determination section 530 to perform the touch recognition high in accuracy by determining the continuity of the linear pattern 800 in the boundary part A.

According also to such a fifth embodiment as described hereinabove, substantially the same advantages as in the first embodiment described above can be exerted.

It should be noted that the shape of the linear pattern 800 is not limited to the sinusoidal shape providing the part (nonparallel part) tilted from the epipolar line EL is provided, and can also be, for example, a triangular wave shape, or a sawtooth wave shape.

Sixth Embodiment

Then, an image recognition unit according to a sixth embodiment of the invention will be described.

Figure 18:
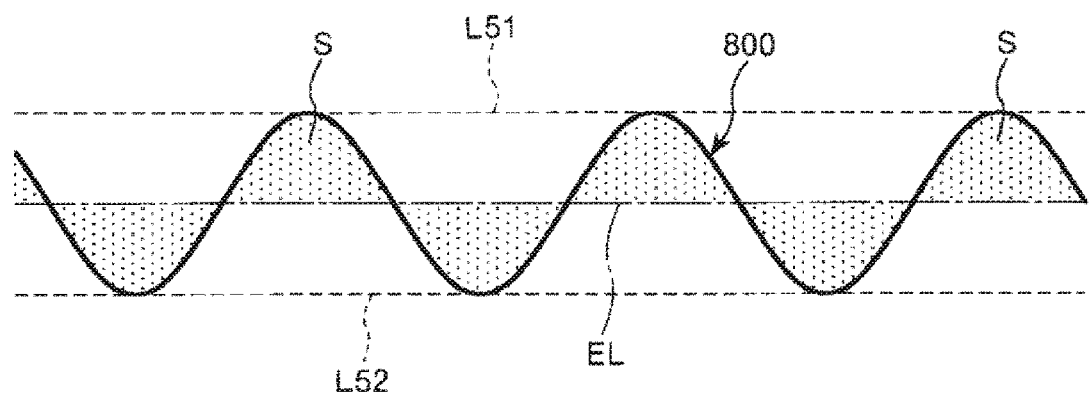
FIG. 18 is a diagram showing a periodic pattern used in an image recognition unit according to a sixth embodiment of the invention.
Figure 19:
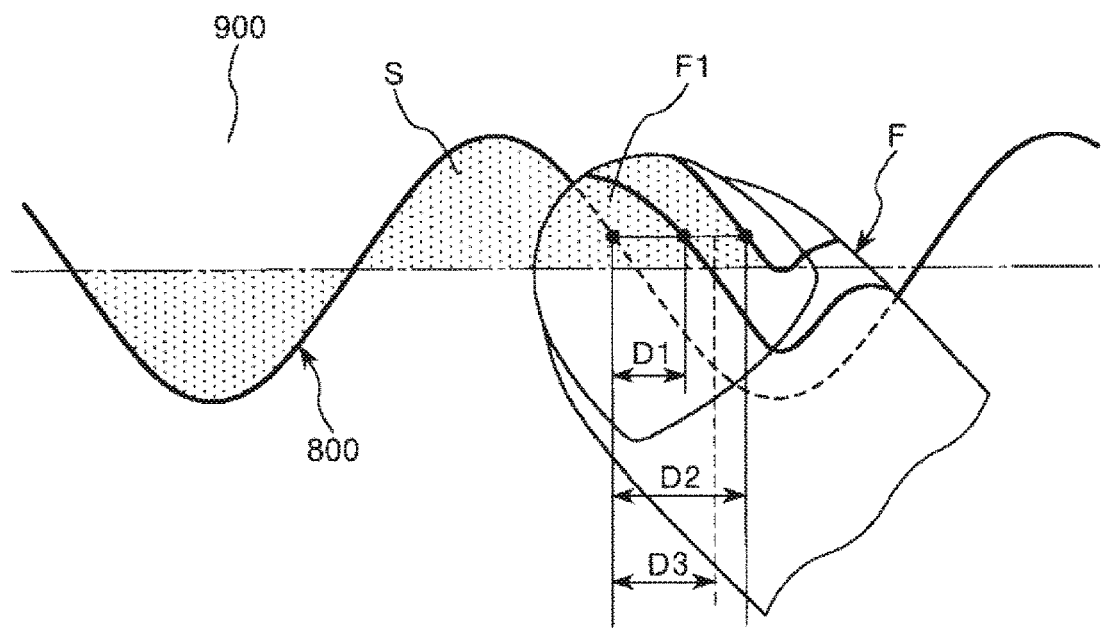
FIG. 19 is a diagram for explaining a method of touch recognition using the linear pattern shown in FIG. 18.

FIG. 18 is a diagram showing a periodic pattern used in the image recognition unit according to the sixth embodiment of the invention. FIG. 19 is a diagram for explaining a method of the touch recognition using the linear pattern shown in FIG. 18.

Hereinafter, the image recognition unit according to the sixth embodiment of the invention will be described wherein the description will be presented with a focus mainly on the differences from the embodiment described above, and the explanation regarding substantially the same matters will be omitted.

The image recognition unit according to the sixth embodiment is substantially the same as the fifth embodiment described above except the point that the linear pattern is different. It should be noted that the constituents substantially the same as those of the embodiment described above are denoted by the same reference symbols.

In the fifth embodiment described above, it is described that the continuity of the linear pattern 800 is maintained even in the boundary part A in the case in which the fingertip F1 has contact with the screen 900. However, depending on the shape and the size of the fingertip F1, there can be the case in which the continuity is lost, and in such a case, there is a possibility that erroneous touch recognition is performed. Therefore, by using the linear pattern 800 of the present embodiment, it is possible to effectively solve the problem described above.

As shown in FIG. 18, the linear pattern 800 of the present embodiment has a configuration in which the contour has a sinusoidal shape, and the regions S each surrounded by the contour and the epipolar line EL (EL') are filled with a predetermined luminance. When adopting such a configuration, it is possible to easily determine the continuity of the contour of the region S from the stereo-rectified image.

As described above, the continuity of the linear pattern 800 may be lost in the boundary part A irrespective of whether or not the fingertip F1 has contact with the screen 900. However, even in such a case, as shown in FIG. 19, the displacement (the magnitude of the discontinuity) D1 of the position of the linear pattern 800 in the case in which the fingertip F1 has contact with the screen 900 becomes smaller than the displacement D2 in the case in which the fingertip F1 does not have contact with the screen 900. Therefore, it is sufficient to set a certain level of displacement D3 as a threshold value, and determine the "contact state" if the displacement is smaller than the displacement D3, and determine the "non-contact state" if the displacement is larger than the displacement D3.

According to such a method, the touch recognition higher in accuracy becomes possible. Further, according to the linear pattern 800 related to the present embodiment, an accurate analysis becomes possible even in the environment in which the surrounding environment varies due to the outside light or the like. Further, even if the pitch of the linear pattern 800 is set relatively long, there is a little possibility of incurring deterioration in accuracy of the touch recognition.

According also to such a sixth embodiment as described hereinabove, substantially the same advantages as in the first embodiment described above can be exerted.

It should be noted that the shape of the linear pattern 800 is not limited to the sinusoidal shape providing the component (nonparallel component) tilted from the epipolar line EL is provided, and can also be, for example, a triangular wave shape, or a sawtooth wave shape.

Seventh Embodiment

Then, an image recognition unit according to a seventh embodiment of the invention will be described.

Figure 20:
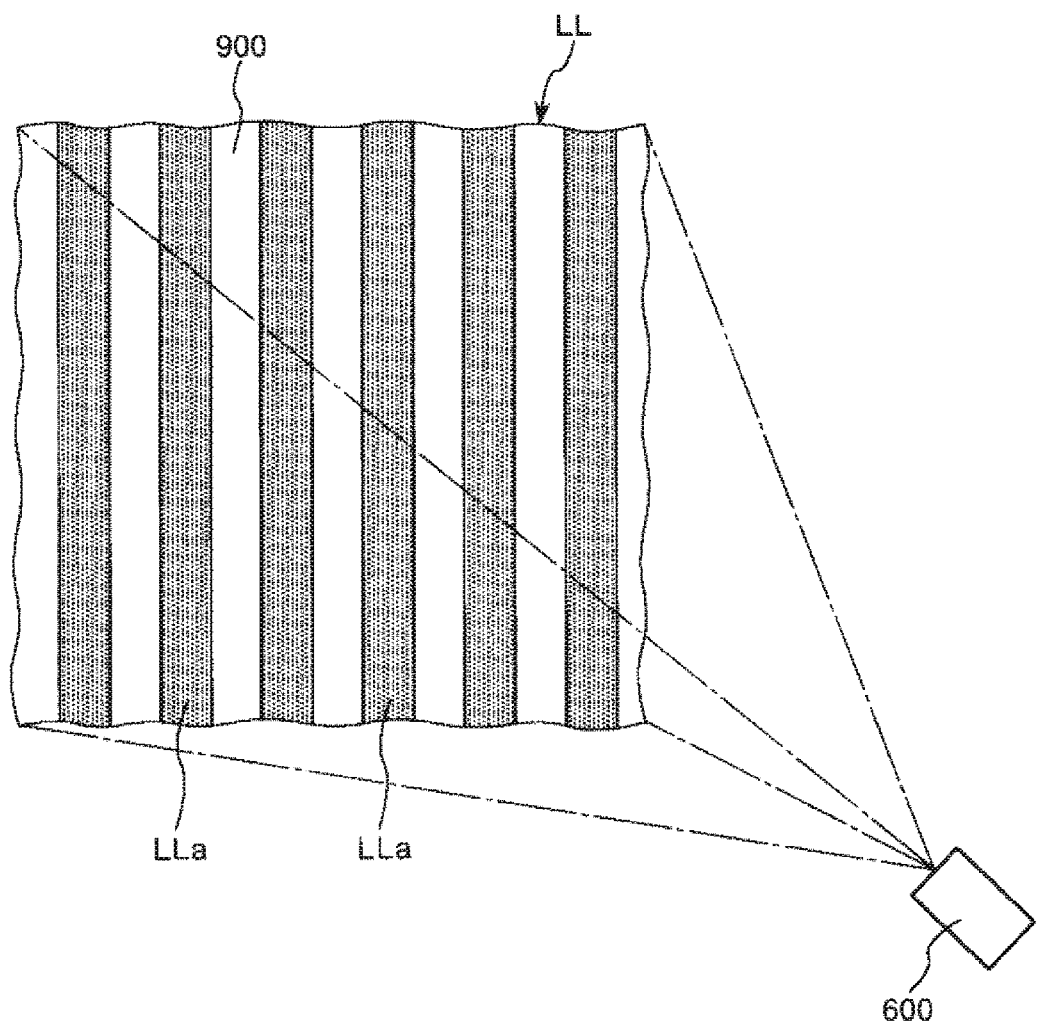
FIG. 20 is a diagram showing illumination light used in an image recognition unit according to a seventh embodiment of the invention.
Figure 21:
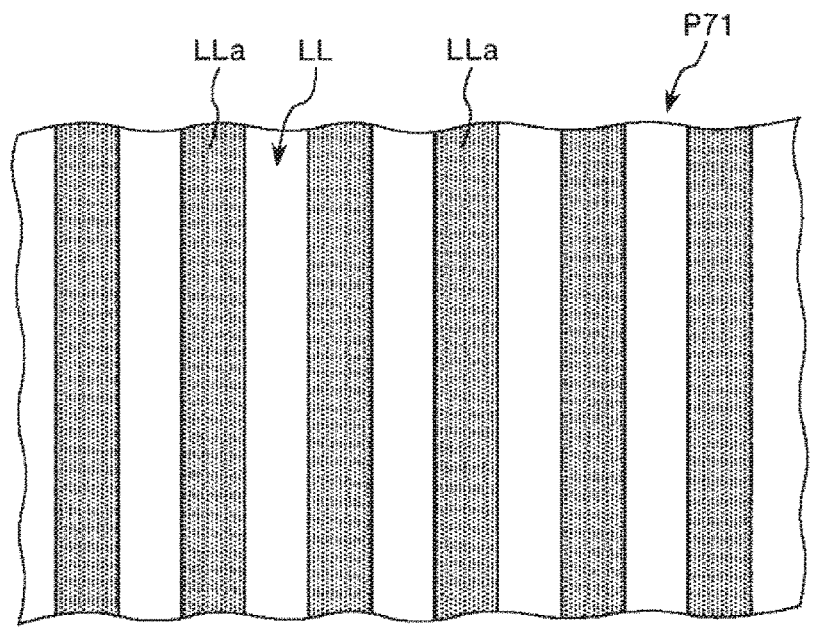
FIG. 21 is a diagram for explaining a detection method of a finger using the illumination light shown in FIG. 20.
Figure 22:
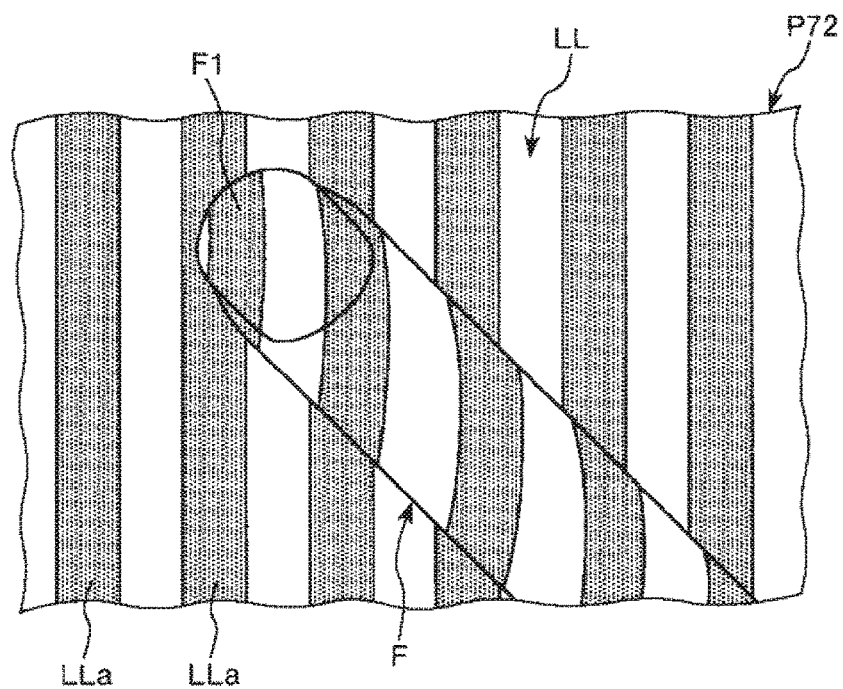
FIG. 22 is a diagram for explaining the detection method of a finger using the illumination light shown in FIG. 20.

FIG. 20 is a diagram showing illumination light used in the image recognition unit according to the seventh embodiment of the invention. FIG. 21 and FIG. 22 are diagrams for explaining a detection method of the finger using the illumination light shown in FIG. 20.

Hereinafter, the image recognition unit according to the seventh embodiment of the invention will be described wherein the description will be presented with a focus mainly on the differences from the embodiment described above, and the explanation regarding substantially the same matters will be omitted.

The image recognition unit according to the seventh embodiment is substantially the same mainly as in the first embodiment described above except the point that the image recognition unit according to the seventh embodiment detects the finger F using NIR light (infrared light having the wavelength in a range of about 800 through 2500 nm) to perform the touch recognition. It should be noted that the constituents substantially the same as those of the embodiment described above are denoted by the same reference symbols.

In the image recognition unit 100 according to the present embodiment, an NIR camera capable of imaging the NIR light is used as the camera 400.

Further, in the image recognition unit 100 according to the present embodiment, the linear pattern 800 projected by the projector 300 is generated using the NIR light. In this case, it is sufficient to change the light source 310 of the projector 300 explained in the first embodiment described above to a configuration capable of emitting an NIR laser. By using the NIR light as the linear pattern 800, there is no chance of deteriorating the picture from the projector 200, and further, even under the environment in which the outside light enters, high contrast (difference in luminance between the first region 810 and the second region 820) of the linear pattern 800 can be exerted.

Further, the image recognition unit 100 further has a projector (an illumination light irradiation device) 600 for irradiating the screen 900 with illumination light LL as shown in FIG. 20. In addition to the projector 200, the projector 300, the camera 400, and the image recognition device 500. The projector 600 irradiates the screen 900 with the illumination light LL as the NIR light so that the illumination light LL spreads in the entire area of the screen 900. As described later, such illumination light LL is used for improving the detection accuracy of the finger F.

The illumination light LL has a lattice pattern having bright lines LLa extending in a vertical direction (a direction crossing the linear pattern 800) of the sheet periodically arranged in the lateral direction. By adopting such a pattern, the illumination light LL and the linear pattern 800 both formed of the NIR light can easily be distinguished from each other. It should be noted that the pattern of the illumination light LL is not particularly limited, and it is possible for the bright lines LLa to be tilted with respect to the linear pattern 800, or to be curved to form a circular arc shape. Further, by displaying (displaying a time-sharing manner), for example, the illumination light LL and the linear pattern 800 at respective time points different from each other, it is possible to distinguish the illumination light LL and the linear pattern 800 from each other.

Then, the function of the illumination light LL will be described. In the state in which the image from the projector 200 is displayed on the screen 900, the finger F is also irradiated with light of a variety of colors (hue, chroma, and luminance) from the projector 200. Therefore, it becomes difficult to extract the flesh-color-like area in the HSV color system in the measurement point determination section 510, and there can be the case in which the determination of the fingertip F1 cannot accurately be performed. Therefore, in order to improve the detection accuracy of the fingertip F1, the illumination light LL is used.

The utilization method of the illumination light LL will be described. Firstly, the image of the illumination light LL projected on the screen 900 is obtained by the camera 400 in the state in which the finger F is absent, and then the stereo-rectified image of that image is stored as a reference stereo-rectified image P71 shown in FIG. 21. Then, the measurement point determination section 510 extracts the finger F based on the difference between a comparative stereo-rectified image P72, which is obtained by the camera 400 while in use and then stereo-collimated, and the reference stereo-rectified image P71. For example, in the case in which the finger F is present in the comparative stereo-rectified image P72, since the displacement occurs between the illumination light LL on the screen 900 and the illumination light LL on the finger F as shown in FIG. 2, it is possible for the measurement point determination section 510 to extract the finger F from the displacement (difference). The process (from the determination of the fingertip F1 to the touch recognition) after extracting the finger F is substantially the same as in the first embodiment described above.

Here, it is preferable for the pitch of the illumination light LL to be roughly equal to the pitch of the linear pattern 800. Thus, the determination of the continuity of the linear pattern 800 by the pattern determination section 530 can be performed by the comparison with the reference stereo-rectified image P71. Therefore, the continuity of the linear pattern 800 can more accurately be determined.

According to such a configuration, it is possible to perform more accurate extraction of the finger F without being affected by the image displayed on the screen 900 by the projector 200. Further, since the NIR light which is not visible to humans is used as the illumination light LL, there is no possibility of deteriorating the picture from the projector 200. In particular, when using the illumination light LL having the lattice pattern as in the present embodiment, since it is possible to compare the reference stereo-rectified image P71 and the comparative stereo-rectified image P72 with each other using the images obtained by digitizing the reference stereo-rectified image P71 and the comparative stereo-rectified image P72, the extraction of the finger F becomes difficult to be affected by the external environment.

The configuration of the projector 600 is not particularly limited providing the irradiation with the illumination light LL can be performed. For example, it is possible to adopt a configuration having a light source for emitting the NIR laser and a diffraction grating for diffracting the NIR laser emitted from the light source, or to use a liquid crystal type projector, a light scanning type projector, or a DMD type projector each having the light source capable of emitting the NIR light. Further, it is also possible for the projector 200 to also function as the projector 600. In other words, it is also possible for the projector to be provided with a configuration of emitting the picture light and the illumination light LL. In this case, it is also possible to adopt a configuration in which, for example, the projector 200 emits the red light, the green light, the blue light, and the NIR light at the same time, or a configuration in which the projector 200 emits the red light, the green light, the blue light, and the NIR light in a time-sharing manner. In the case of emitting the light in a time-sharing manner, the picture is generated by combining the red light, the green light, and the blue light on the screen 900, and the illumination light LL is generated by the NIR light.

According also to such a seventh embodiment as described hereinabove, substantially the same advantages as in the first embodiment described above can be exerted.

It should be noted that although the illumination light LL having the lattice-shaped pattern is used in the present embodiment, it is also possible to adopt solid illumination light LL without a pattern. In other words, it is also possible for the illumination light LL to be what irradiates the entire area of the screen 900 uniformly. Also by such illumination light LL, it is possible to extract the finger F due to the difference in luminance value between the finger and the screen. In particular, due to the fact that the diffractive grating and so on for generating the lattice-shaped pattern becomes unnecessary, it is possible to achieve simplification of the device compared to the present embodiment.

Further, although the linear pattern 800 is generated using the NIR light in the image recognition unit 100 according to the present embodiment, it is possible to generate the linear pattern 800 using the visible light. It should be noted that in this case, it is necessary to adopt the camera 400 capable of imaging in two bands of the NIR light and the visible light.

Eighth Embodiment

Then, an image recognition unit according to an eighth embodiment of the invention will be described.

Figure 23:
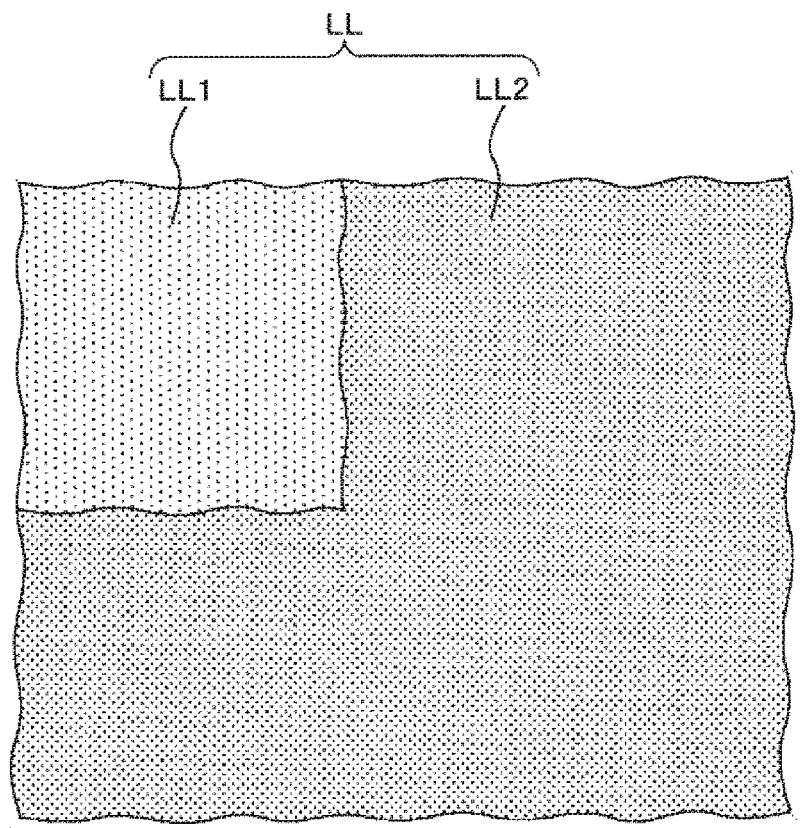
FIG. 23 is a plan view showing illumination light used in an image recognition unit according to an eighth embodiment of the invention.
Figure 24:
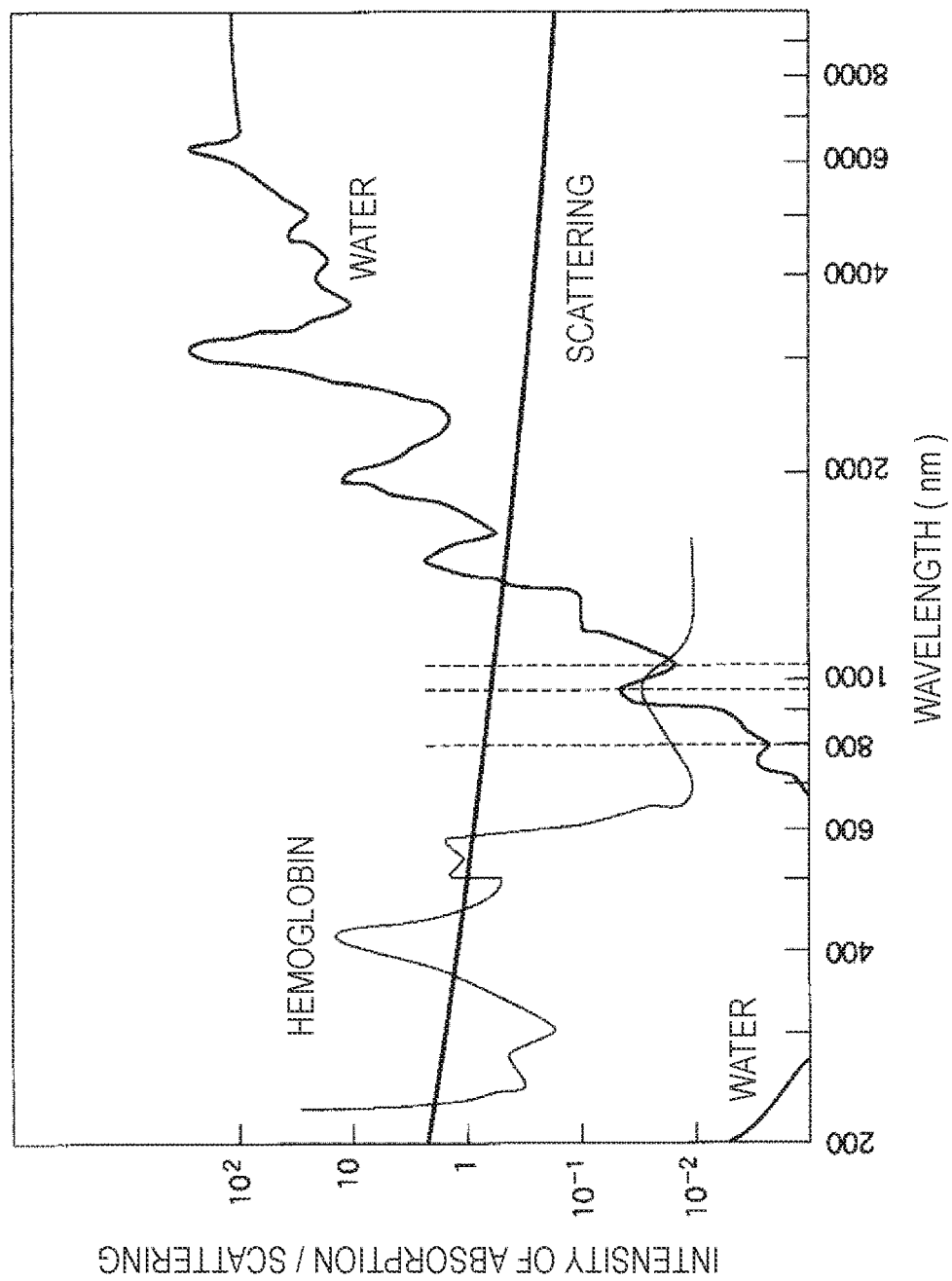
FIG. 24 is a graph showing the wavelength absorption characteristic of a substance constituting the finger.

FIG. 23 is a plan view showing illumination light used in the image recognition unit according to the eighth embodiment of the invention. FIG. 24 is a graph showing the wavelength absorption characteristic of a substance constituting the finger.

Hereinafter, the image recognition unit according to the eighth embodiment of the invention will be described wherein the description will be presented with a focus mainly on the differences from the embodiment described above, and the explanation regarding substantially the same matters will be omitted.

The image recognition unit according to the eighth embodiment is substantially the same mainly as the seventh embodiment described above except the point that the configuration of the illumination light is different. It should be noted that the constituents substantially the same as those of the embodiment described above are denoted by the same reference symbols.

In the seventh embodiment described above, since it is necessary to use the reference stereo-rectified image P71 for the extraction of the finger F, in the case in which, for example, the position of the screen 900 changes, or the case in which the shape of the screen 900 changes (in other words, in the case in which the background of the finger F changes), it is necessary to obtain the reference stereo-rectified image P71 once again in each case, and the extraction of the finger F cannot smoothly be achieved. In other words, the seventh embodiment described above exerts the particularly excellent advantage in the case in which the position and the shape of the screen 900 are fixed. In contrast, in the present embodiment described below, since the reference stereo-rectified image is not required, it is possible to smoothly extract the finger F even in the case in which the position of the screen 900 changes, or the case in which the shape of the screen 900 changes.

As shown in FIG. 23, the illumination light LL of the present embodiment includes first illumination light LL1 having a first wavelength, and second illumination light LL2 having a second wavelength different from the first wavelength. Then, the first illumination light LL1 and the second illumination light LL2 are emitted at the same time. It should be noted that it is also possible for the first illumination light LL1 and the second illumination light LL2 to be emitted at respective time points different from each other (in a time-sharing manner). Further, the first illumination light LL1 and the second illumination light LL2 are both solid light having no pattern, and are arranged to uniformly (evenly) illuminate the irradiation area.

Further, the first illumination light LL1 and the second illumination light LL2 are both the NIR light, and at the same time different in wavelength absorption characteristic by the finger F from each other. FIG. 24 is a graph showing the wavelength absorption characteristic of a substance constituting the finger F. As shown in the drawing, for example, the light absorption by water and hemoglobin is low around 800 nm and around 1050 nm compared to that in the surrounding wavelengths on the one hand, the light absorption by water and hemoglobin is high around 970 nm compared to that in the surrounding wavelengths on the other hand. Therefore, in the present embodiment, the wavelength of the first illumination light LL1 is set to 800 nm, and the wavelength of the second illumination light LL2 is set to 970 nm. It should be noted that the wavelengths of the first and second illumination light LL1, LL2 are not particularly limited providing the wavelength absorption characteristics are different from each other, and can arbitrarily be set in accordance with the composition of the object.

Further, the camera 400 is a 2-band camera capable of obtaining the first image by the first illumination light LL1 and the second image by the second illumination light LL2 at the same time. Since the difference occurs between the first image and the second image due to the difference in wavelength absorption characteristic described above, it is possible for the measurement point determination section 510 to perform the extraction of the finger F by comparing the first image and the second image with each other. Such a method is known to the public as "multispectral sensing," "hyperspectral sensing," and so on.

According to such a configuration, since the reference stereo-rectified image in the seventh embodiment described above is unnecessary, it is possible to smoothly extract the finger F even in the case in which the position of the screen 900 changes, or the case in which the shape of the screen 900 changes.

According also to such an eighth embodiment as described hereinabove, substantially the same advantages as in the first embodiment described above can be exerted.

Ninth Embodiment

Then, an image recognition unit according to a ninth embodiment of the invention will be described.

Figure 25:
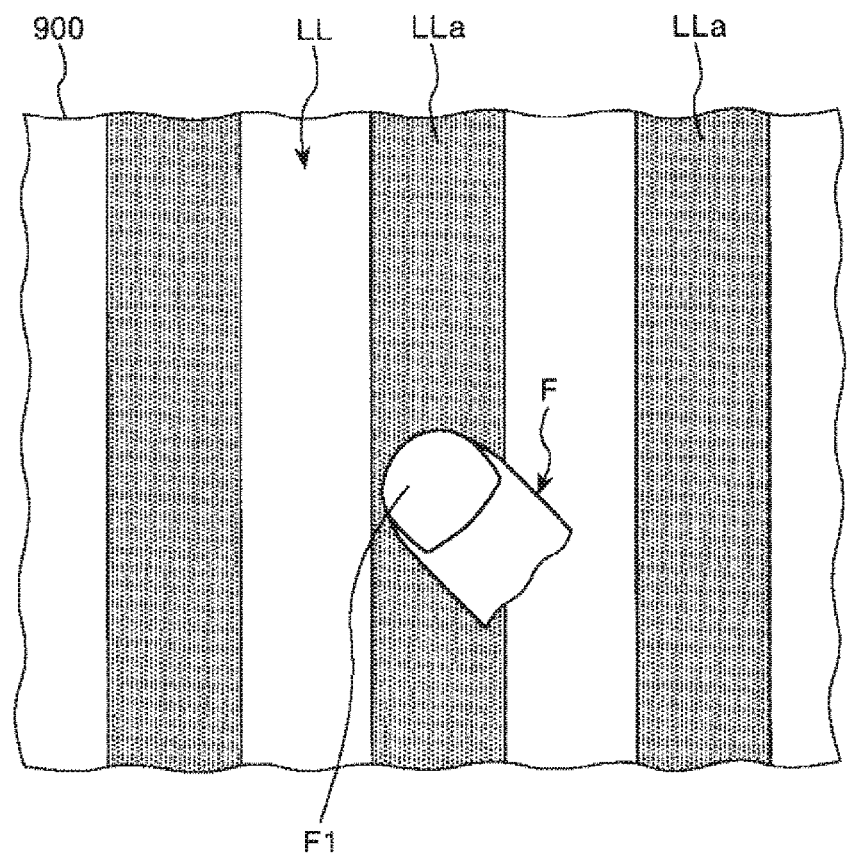
FIG. 25 is a diagram showing illumination light used in an image recognition unit according to a ninth embodiment of the invention.
Figure 26:
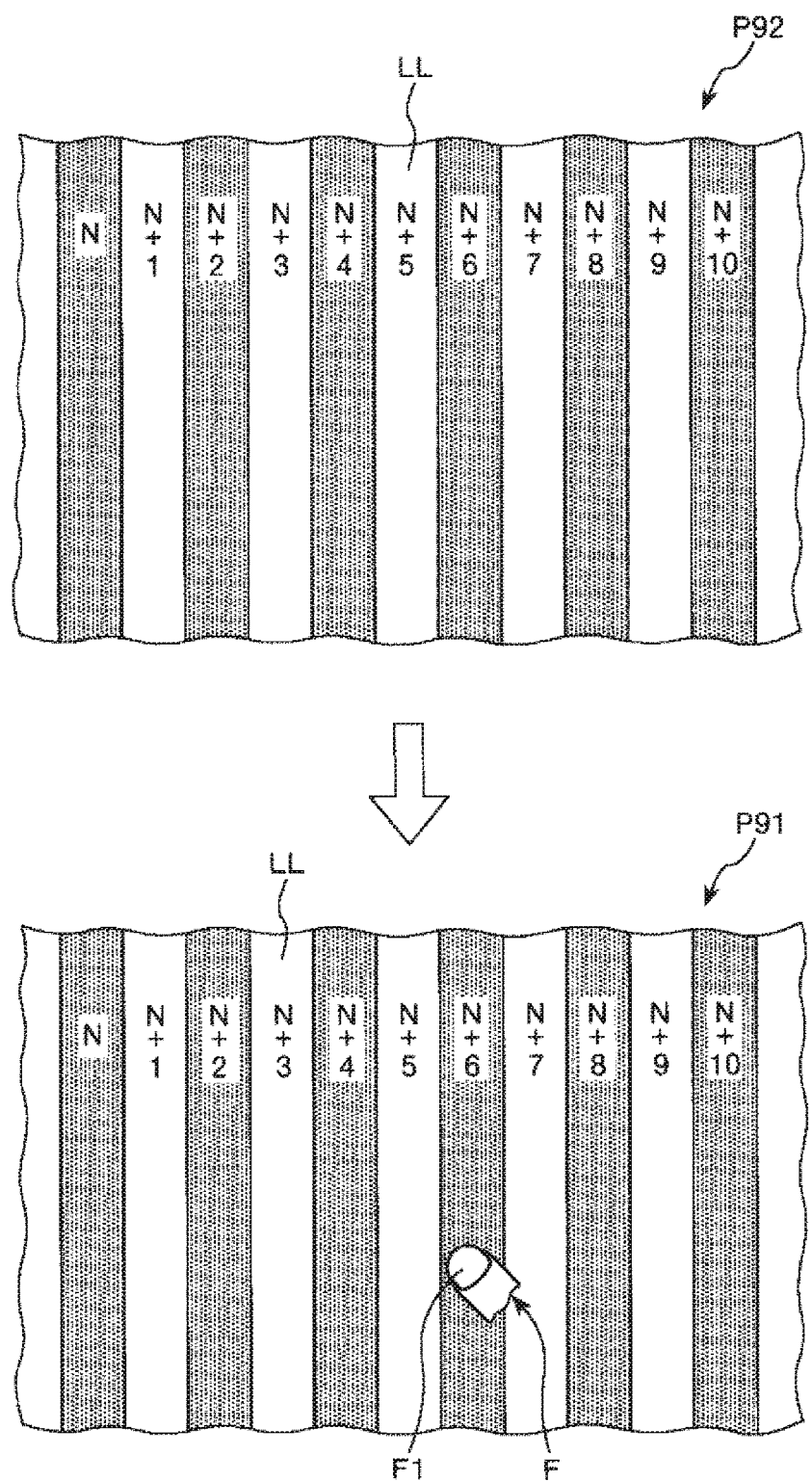
FIG. 26 is a diagram for explaining address assignment to the illumination light.
Figure 27:
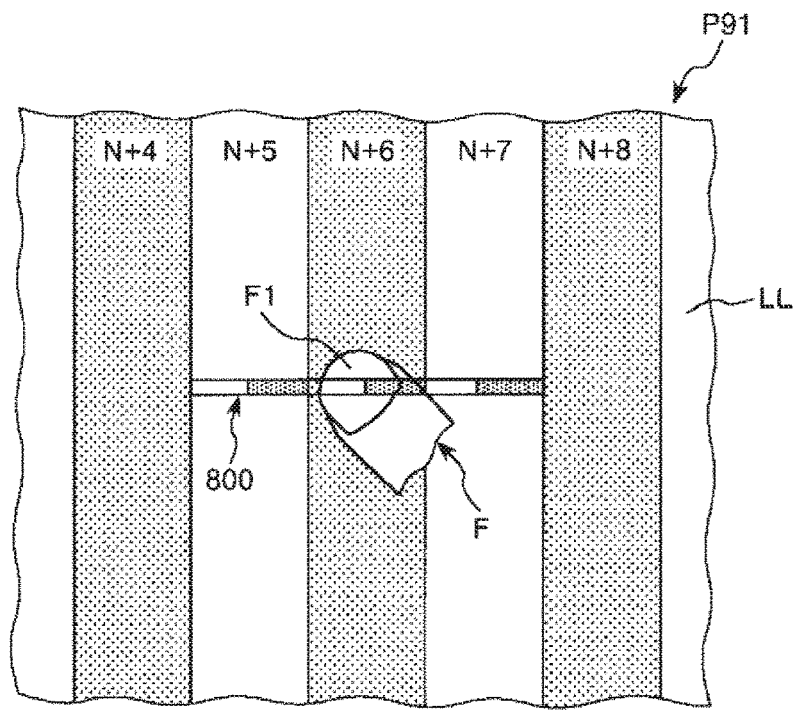
FIG. 27 is a diagram for explaining a touch recognition method.
Figure 28:
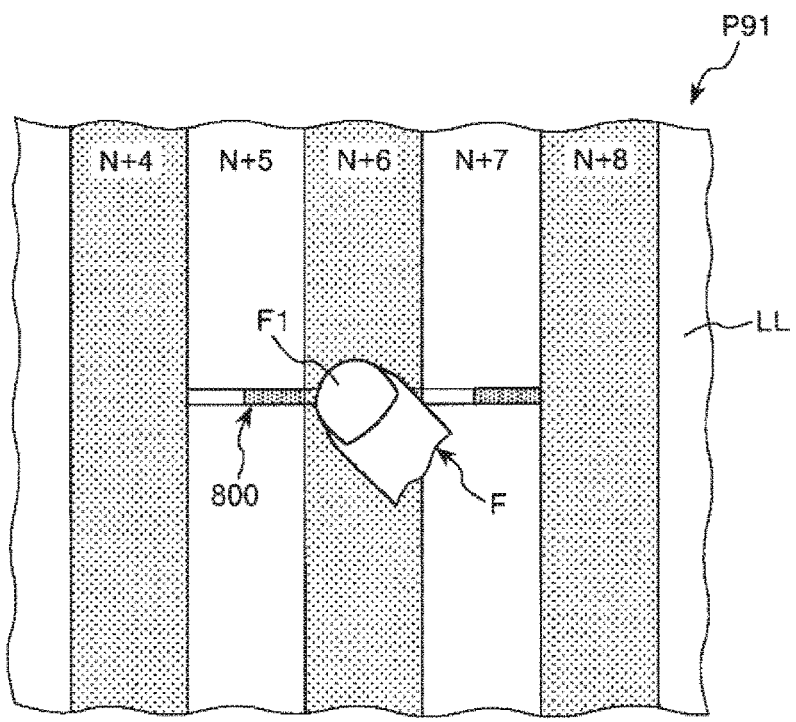
FIG. 28 is a diagram for explaining the touch recognition method.

FIG. 25 is a diagram showing illumination light used in the image recognition unit according to the ninth embodiment of the invention. FIG. 26 is a diagram for explaining address assignment to the illumination light. FIG. 27 and FIG. 28 are each a diagram for explaining a touch recognition method.

Hereinafter, the image recognition unit according to the ninth embodiment of the invention will be described wherein the description will be presented with a focus mainly on the differences from the embodiment described above, and the explanation regarding substantially the same matters will be omitted.

The image recognition unit according to the ninth embodiment is substantially the same as the seventh embodiment described above except the point that the addresses are set to the illumination light LL. It should be noted that the constituents substantially the same as those of the embodiment described above are denoted by the same reference symbols.

In the present embodiment, as shown in FIG. 25, the pitch (the width of the bright line LLa included in the repetitive pattern of the illumination light LL and the width between the adjacent bright lines LLa) of the length of the illumination light LL is set larger than the width of the fingertip F1. Further, as shown in FIG. 26, the stereo-rectified image P91 is compared with addressing image P92 prepared in advance, and the addresses are assigned to the illumination light LL in the stereo-rectified image P91. The assignment method of the addresses is not particularly limited, but there can be cited a method of disposing an identification pattern in each of the addresses. The measurement point determination section 510 determines the fingertip F1, and at the same time identifies the address at which the fingertip F1 is located based on the addresses assigned. In the example shown in the drawings, the fingertip F1 is located at the address [N+6].

As in the stereo-rectified image shown in FIG. 27, the linear pattern display section 520 displays the linear pattern 800 in a relatively small area including the address at which the fingertip F1 is located. As described above, by displaying the linear pattern 800 only in the vicinity of the address where the fingertip F1 has been detected, the determination of the difference in the linear pattern 800 can be performed in a short period of time. Further, since the pitch of the linear pattern 800 can be shortened, the fingertip F1 can accurately be detected. It should be noted that in the example shown in the drawings, the linear pattern 800 is displayed at the address [N+6] where the fingertip F1 is located, and the adjacent addresses [N+5], [N+7] on both sides.

On this occasion, in the case in which the fingertip F1 has contact with the screen 900, or the case in which the separation distance from the screen 900 is short (in the case in which the separation distance is within the distance corresponding to the one pitch of the illumination light LL) if the fingertip F1 does not have contact with the screen 900, the linear pattern 800 is projected also on the fingertip F1. Therefore, as shown in FIG. 27, the stereo-rectified image P91 at this moment becomes an image in which the linear pattern 800 is projected on the fingertip F1. In contrast, in the case in which the fingertip F1 does not have contact with the screen 900, and the separation distance from the screen 900 is long (the case in which the separation distance exceeds the distance corresponding to the one pitch of the illumination light LL), the linear pattern 800 is not projected on the fingertip F1, and the stereo-rectified image P91 becomes an image in which a part of the linear pattern 800 is shaded by the fingertip F1 as shown in FIG. 28.

Due to such a difference between the images, it is possible to exclude the state in which the fingertip F1 is significantly distant from the screen 900, and it is sufficient to determine the continuity of the linear pattern 800 to perform the touch recognition only in the case in which the fingertip F1 has contact with the screen 900, or the case in which the separation distance from the screen 900 is short even if the fingertip F1 does not have contact with the screen 900. Therefore, the calculation load for the touch recognition can be reduced, and at the same time, the touch recognition high in accuracy becomes possible. Further, since the phase wrapping can effectively be suppressed, it is possible to shorten the pitch of the linear pattern 800, and thus, the touch recognition higher in accuracy becomes possible.

It should be noted that the acquisition timing of the addressing image P92 is not particularly limited, and differs by the configuration of the screen 900. For example, if the screen 900 is fixed, and the shape of the screen 900 does not change, it is sufficient to obtain the addressing image P92 before performing the image display by the projector 200. In contrast, in the case in which the position of the screen 900 changes, or the case in which the shape of the screen 900 changes, it is sufficient to continuously obtain the addressing image P92, and assign the addresses to the stereo-rectified image P91 using the addressing image P92 obtained immediately before the assignment.

According also to such a ninth embodiment as described hereinabove, substantially the same advantages as in the first embodiment described above can be exerted.

It should be noted that the illumination light LL and the linear pattern 800 are generated using the NIR light in the present embodiment, but can also be generated using visible light. In the case of generating the illumination light LL using the visible light, it is sufficient to irradiate the outside of the area in which the image is displayed with the illumination light LL so that the image of the projector 200 does not deteriorate, and estimate the addresses in that area from the state of the illumination light LL with which the outside is irradiated to determine the addresses. Further, as described above, since the linear pattern 800 is displayed only in the relatively small range, there is no chance that the image of the projector 200 is significantly deteriorated if the linear pattern 800 is generated using the visible light.

Tenth Embodiment

Then, an image recognition unit according to a tenth embodiment of the invention will be described.

Figure 29:
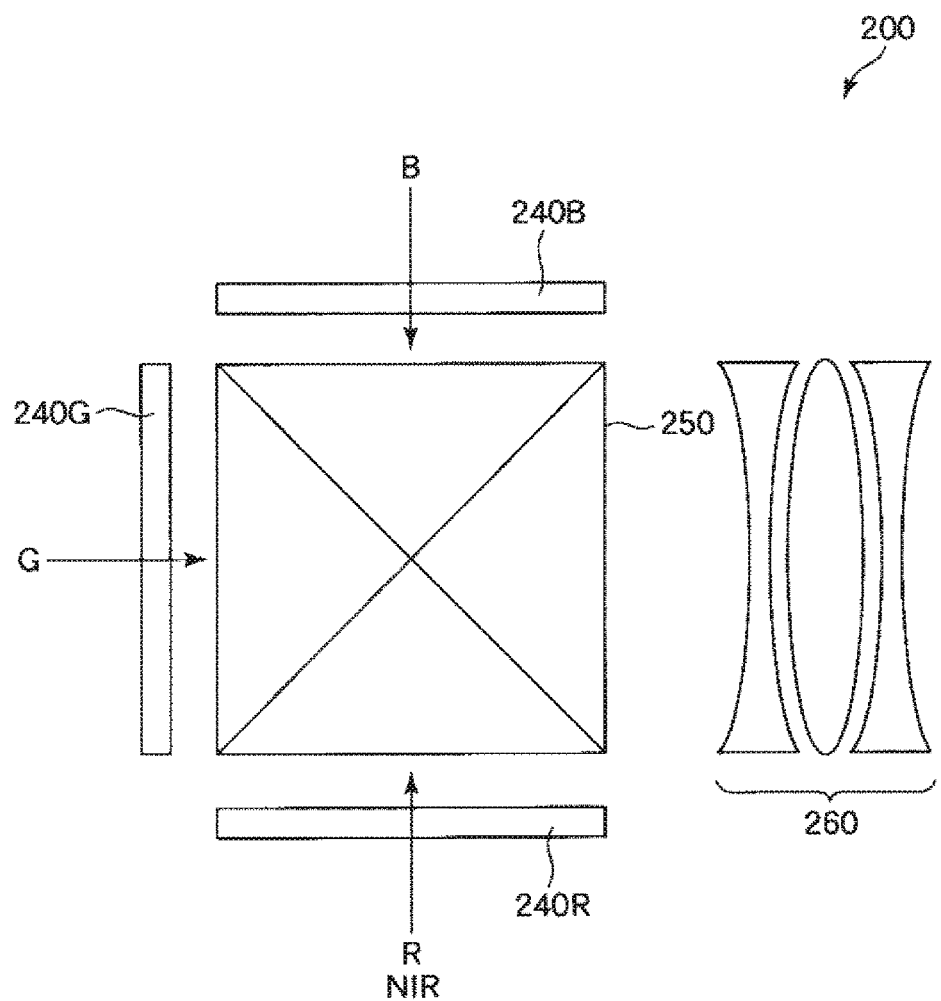
FIG. 29 is a configuration diagram of a projector used in an image recognition unit according to a tenth embodiment of the invention.

FIG. 29 is a configuration diagram of a projector used in the image recognition unit according to the tenth embodiment of the invention.

Hereinafter, the image recognition unit according to the tenth embodiment of the invention will be described wherein the description will be presented with a focus mainly on the differences from the embodiment described above, and the explanation regarding substantially the same matters will be omitted.

The image recognition unit according to the tenth embodiment is substantially the same as the first embodiment described above except the point that the projector 200 also functions as the projector 300. It should be noted that the constituents substantially the same as those of the embodiment described above are denoted by the same reference symbols.

The projector 200 according to the present embodiment is substantially the same as the configuration explained in the first embodiment described above, but it is arranged that the NIR light enters the liquid crystal display element 240R together with the red light R as shown in FIG. 29. Since the red light R is smaller in wavelength difference from the NIR light compared to the green light G and the blue light B, it is possible to realize the same optical system with relative ease. According to the projector 200 having such a configuration, it is possible to project the image and the linear pattern 800 on the screen 900 at the same time. It should be noted that according to the projector 200 of the present embodiment, the first regions 810 of the linear pattern 800 are formed of the red light and the NIR light, and the second regions 820 thereof are formed of a color (OFF state of the NIR light) different from the red color. According to such a linear pattern 800, since it is possible to obtain the high contrast between the first regions 810 and the second regions 820 while suppressing the brightness on the screen 900, the touch recognition higher in accuracy becomes possible.

According also to such a tenth embodiment as described hereinabove, substantially the same advantages as in the first embodiment described above can be exerted.

Although the image recognition device, the image recognition method and the image recognition unit according to the invention are hereinabove explained based on the embodiments shown in the drawings, the invention is not limited to these embodiments. For example, in the image recognition device according to the invention, the configuration of each of the constituents can be replaced with an arbitrary configuration having substantially the same function, and further, it is also possible to add other arbitrary constituents.

REFERENCE SIGNS LIST 100 image recognition unit
200 projector
240B, 240G, 240R liquid crystal display element
250 dichroic prism
260 projection lens system
300 projector
310 light source
311B, 311G, 311R light source
312B, 312G, 312R collimator lens
313 light combining section
313a, 313b, 313c dichroic mirror
314 collecting lens
320 scanning section
330 movable section
331 mirror
341, 342 shaft section
350 drive frame section
361, 362 shaft section
370 support section
400 camera
410 light receiving unit
411 lens system
412 imaging element
500 image recognition device
510 measurement point determination section
520 linear pattern display section
530 pattern determination section
600 projector
800 linear pattern
800A first linear pattern
800B second linear pattern
800a region
800b region
810 first region
820 second region
900 screen
A boundary part
B blue light
C1 camera center
C2 angle alteration center
D1, D2, D3 displacement
EL, EL' epipolar line
F finger
F1 fingertip
G green light
J1, J2 axis
l1, l2, l3 straight line
L51, L52 line segment
LL illumination light
LL1 first illumination light
LL2 second illumination light
LLa bright line
La picture light
Lb modulated light
P11, P21, P51, P52 stereo-rectified image
P71 reference stereo-rectified image
P72 comparative stereo-rectified image
P91 stereo-rectified image
P92 addressing image
Pe epipolar point
R red light
S region
T1 first pitch
T2 second pitch
x coordinate
Σ epipolar plane
π1 image plane
π2 virtual image plane

The invention claimed is:

1. An image recognition device used in an image display unit including an imaging device adapted to image an image display surface, and a detecting image display device adapted to display a detecting image on the image display surface, the image recognition device comprising: a measurement point determination section adapted to detect an object located between the imaging device and the image display surface from an image obtained by the imaging device to determine a measurement target point of the object; a linear pattern display section adapted to make the detecting image display device display a linear pattern provided with a periodic pattern on an epipolar line which is determined from a positional relationship between the imaging device and the detecting image display device, and passes through the measurement target point; and a pattern determination section adapted to determine, from an image obtained by the imaging device and including the linear pattern, a contact state in which the object has contact with the image display surface based upon a difference between the linear pattern included in the image and the linear pattern in a case in which the object is absent; wherein the pattern determination section determines the contact state in a case that the linear pattern has a continuity in the image, and determines a non-contact state in which the object does not have contact with the image display surface in a case that the linear pattern does not have the continuity in the image.

2. The image recognition device according to claim 1, wherein the pattern determination section determines continuity of the linear pattern.

3. The image recognition device according to claim 1, wherein
the linear pattern has a first linear pattern having luminance varying with a first pitch.

4. The image recognition device according to claim 1, wherein
the linear pattern has a first linear pattern having luminance varying with a first pitch, and a second linear pattern having luminance varying with a second pitch different from the first pitch.

5. The image recognition device according to claim 4, wherein
the first linear pattern and the second linear pattern are displayed at respective time points different from each other.

6. The image recognition device according to claim 4, wherein
the first linear pattern and the second linear pattern are displayed so as to be arranged side by side in a direction crossing the epipolar line.

7. The image recognition device according to claim 1, wherein
the linear pattern is generated using infrared light.

8. The image recognition device according to claim 1, wherein
the linear pattern includes a line segment having a part tilted with respect to the epipolar line.

9. The image recognition device according to claim 1, wherein
the image display unit has an illumination light irradiation device adapted to irradiate the image display surface with illumination light, and
the measurement point determination section detects the object from an image including the illumination light obtained by the imaging device.

10. The image recognition device according to claim 9, wherein
the illumination light has a pattern having luminance periodically varying along an extending direction of the epipolar line.

11. The image recognition device according to claim 10, wherein
an address used for identifying a position is assigned to each part of the pattern varying periodically of the illumination light.

12. An image recognition method used in an image display unit including an imaging device adapted to image an image display surface, and a detecting image display device adapted to display a detecting image on the image display surface, the image recognition method comprising: detecting an object located between the imaging device and the image display surface from an image obtained by the imaging device to determine a measurement target point of the object; making the detecting image display device display a linear pattern having luminance varying periodically on an epipolar line which passes through the measurement target point, and is determined from a positional relationship between the imaging device and the detecting image display device; and determining, from an image obtained by the imaging device and including the linear pattern, a contact state in which the object has contact with the image display surface based upon a difference between the linear pattern included in the image and the linear pattern in a case in which the object is absent; determining the contact state in a case that the linear pattern has a continuity in the image, and determining a non-contact state in which the object does not have contact with the image display surface in a case that the linear pattern does not have the continuity in the image.

13. An image recognition unit comprising:
the image recognition device according to claim 1;
the imaging device; and
the detecting image display device.

14. The image recognition unit according to claim 13, comprising:
an image display device adapted to display an image on the image display surface.

15. The image recognition device according to claim 1, wherein the pattern determination section determines the non-contact state in a case that the linear pattern in the image is partially shadowed by the object.

16. The image recognition device according to claim 1, wherein
the linear pattern has first regions having a first luminance and second regions having a second luminance different from the first luminance, and
the first regions and the second regions are alternately arranged at regular intervals along the epipolar line, and are arranged across the epipolar line.

17. The image recognition device according to claim 1, wherein
the linear pattern has a sinusoidal shape that has peaks of upward and downward protrusions of a sinusoidal wave, and the peaks are located at a same distance from the epipolar line.

* * * * *